(12) United States Patent
Choi et al.

(10) Patent No.: US 12,523,088 B2
(45) Date of Patent: Jan. 13, 2026

(54) MULTI-PANE GLASS UNIT AND A METHOD FOR MANUFACTURING THE SAME

(71) Applicant: Corning Incorporated, Corning, NY (US)

(72) Inventors: Jae-Young Choi, Seochogu (KR); Joon Hoi Kim, Yongin-si (KR); JinWook Song, Seongnam (KR)

(73) Assignee: CORNING INCORPORATED, Corning, NY (US)

( * ) Notice: Subject to any disclaimer, the term of this patent is extended or adjusted under 35 U.S.C. 154(b) by 523 days.

(21) Appl. No.: 17/785,500

(22) PCT Filed: Dec. 9, 2020

(86) PCT No.: PCT/US2020/063864
§ 371 (c)(1),
(2) Date: Jun. 15, 2022

(87) PCT Pub. No.: WO2021/126608
PCT Pub. Date: Jun. 24, 2021

(65) Prior Publication Data
US 2023/0053939 A1    Feb. 23, 2023

(30) Foreign Application Priority Data
Dec. 18, 2019 (KR) .................. 10-2019-0170212

(51) Int. Cl.
E06B 3/663    (2006.01)
E06B 3/66     (2006.01)
E06B 3/673    (2006.01)

(52) U.S. Cl.
CPC ........ *E06B 3/66366* (2013.01); *E06B 3/6617* (2013.01); *E06B 3/66342* (2013.01); *E06B 3/66347* (2013.01); *E06B 3/67326* (2013.01)

(58) Field of Classification Search
CPC ........... E06B 3/66; E06B 3/663–66371; E06B 2003/6638; Y02B 80/22; Y02A 30/249
See application file for complete search history.

(56) References Cited

U.S. PATENT DOCUMENTS 4,113,904 A * 9/1978 Kiefer ..................... E06B 5/165
                                                            428/920
4,298,389 A * 11/1981 Johnson .................. C03C 3/091
                                                              501/77
(Continued)

FOREIGN PATENT DOCUMENTS

CN    102667044 A    9/2012
CN    104609744 A    5/2015
(Continued)

OTHER PUBLICATIONS

Machine translation of Wo 2014/168219 A1, obtained from EspaceNet.*
(Continued)

*Primary Examiner* — Zheren Jim Yang

(57) ABSTRACT

A multi-pane glass unit includes a first outer glass pane and a second outer glass pane facing each other, a first inner glass pane between the first outer glass pane and the second outer glass pane, a first spacer located between the first outer glass pane and the first inner glass pane, and a second spacer located between the second outer glass pane and the first inner glass pane.

20 Claims, 27 Drawing Sheets

(56) References Cited

U.S. PATENT DOCUMENTS

| | | | |
|---|---|---|---|
| 5,027,941 A | 7/1991 | Lenhardt et al. | |
| 5,270,084 A | 12/1993 | Parker | |
| 5,332,080 A | 7/1994 | Lenhardt et al. | |
| 5,573,618 A | 11/1996 | Rueckheim | |
| 6,609,611 B1 | 8/2003 | Lenhardt | |
| 6,962,638 B2 | 11/2005 | Okino et al. | |
| 7,891,066 B2 | 2/2011 | Aoki et al. | |
| 9,567,793 B2 | 2/2017 | Mader | |
| 2009/0324858 A1* | 12/2009 | Jaeger | E06B 3/6612 156/107 |
| 2010/0211215 A1 | 8/2010 | Yano et al. | |
| 2011/0261429 A1* | 10/2011 | Sbar | G02F 1/133351 156/256 |
| 2012/0222373 A1 | 9/2012 | Bouesnard et al. | |
| 2012/0285605 A1 | 11/2012 | Ripoche et al. | |
| 2012/0297707 A1* | 11/2012 | Lenz | E06B 3/66347 52/204.593 |
| 2014/0290156 A1* | 10/2014 | Bruce | E06B 3/677 52/204.593 |
| 2015/0275567 A1 | 10/2015 | Jun | |
| 2016/0208544 A1* | 7/2016 | Nieminen | E06B 3/6612 |
| 2017/0028686 A1* | 2/2017 | Wilson | B32B 7/05 |
| 2017/0119176 A1* | 5/2017 | Christiansen | A47F 3/0434 |
| 2017/0282637 A1* | 10/2017 | Barazin | B44C 5/08 |
| 2017/0328119 A1* | 11/2017 | Kuster | E06B 3/663 |
| 2018/0038151 A1* | 2/2018 | Clarahan | E06B 7/02 |
| 2018/0044972 A1 | 2/2018 | Bauer et al. | |
| 2018/0216396 A1* | 8/2018 | Isaacs | E06B 3/663 |
| 2018/0259696 A1* | 9/2018 | Borrelli | B32B 17/10486 |
| 2019/0284868 A1* | 9/2019 | Schweitzer | C03C 17/3681 |
| 2019/0368263 A1* | 12/2019 | Begin | E06B 3/58 |
| 2020/0141179 A1* | 5/2020 | Vianello | E06B 3/6617 |
| 2021/0388666 A1* | 12/2021 | Meinardi | E06B 3/66342 |
| 2021/0403375 A1* | 12/2021 | Schneider | B32B 17/10091 |
| 2022/0010609 A1* | 1/2022 | Zucker | F41H 5/263 |
| 2022/0034152 A1* | 2/2022 | Kuster | E06B 3/66323 |
| 2022/0268092 A1* | 8/2022 | Möller | E06B 3/66366 |
| 2023/0015338 A1* | 1/2023 | De Rycke | C03C 8/14 |

FOREIGN PATENT DOCUMENTS

| | | |
|---|---|---|
| CN | 104797772 A | 7/2015 |
| DE | 3308079 C2 | 1/1985 |
| DE | 4437998 A1 | 8/1995 |
| DE | 102010005181 A1 | 7/2011 |
| EP | 2963226 A1 | 1/2016 |
| EP | 3798402 A1 | 3/2021 |
| JP | 09-263428 A | 10/1997 |
| JP | 11-236251 A | 8/1999 |
| JP | 3581154 B2 | 10/2004 |
| JP | 2018-199452 A | 12/2018 |
| KR | 20-1995-0003262 Y1 | 4/1995 |
| KR | 10-0699028 B1 | 3/2007 |
| KR | 10-0828202 B1 | 5/2008 |
| KR | 10-2009-0035937 A | 4/2009 |
| KR | 10-2010-0058708 A | 6/2010 |
| KR | 10-2010-0067993 A | 6/2010 |
| KR | 10-2011-0038229 A | 4/2011 |
| KR | 10-2013-0091375 A | 8/2013 |
| KR | 10-1500683 B1 | 3/2015 |
| WO | 2010/115456 A1 | 10/2010 |
| WO | 2013/114302 A1 | 8/2013 |
| WO | 2014/168219 A1 | 10/2014 |
| WO | 2016/039382 A1 | 3/2016 |

OTHER PUBLICATIONS

Optical properties of soda-lime float glass from spectroscopic ellipsometry, Thin Solid Films, vol. 519 (2011), pp. 2907â2913.*

Chinese Patent Application No. 202080094487.8, Office Action dated Feb. 18, 2023, 4 pages (English Translation Only), Chinese Patent Office.

International Search Report and Written Opinion of the International Searching Authority; PCT/US2020/063864; mailed on Apr. 6, 2021, 11 pages; Korean Patent Office.

European Office Action, EP Application No. 20903413.1, dated Mar. 12, 2025, 7 pages, European Patent Office.

* cited by examiner

MULTI-PANE GLASS UNIT AND A METHOD FOR MANUFACTURING THE SAME

CROSS-REFERENCE TO RELATED APPLICATIONS

This application claims the benefit of priority under 35 U.S.C. § 371 of International Application No. PCT/US2020/063864, filed on Dec. 9, 2020, which claims the benefit of Korean Patent Application No. 10-2019-0170212, filed on Dec. 18, 2019, in the Korean Intellectual Property Office, the disclosure of each of which is incorporated herein in its entirety by reference.

BACKGROUND

1. Field

One or more embodiments of the disclosure relate to a multi-pane glass unit and a method of manufacturing the multi-pane glass unit. In particular, one or more embodiments of the disclosure relate to a multi-pane glass unit including a thin glass and a method of manufacturing the multi-pane glass unit.

2. Description of Related Art

A multi-pane glass unit including a plurality of glass plates may be efficient for heat insulation, soundproof, and/or preventing dew condensation. Such a multi-pane glass unit may be used in buildings, transportation means such as cars, trains, airplanes, etc., windows of electronic devices such as refrigerators or freezers, etc. In general, as the number of glass panes included in the multi-pane glass unit increases, heat insulation, soundproof, and/or anti-dew condensation performances may improve, but a weight of the multi-pane glass unit increases.

SUMMARY

One or more embodiments include a multi-pane glass unit that is lightweight and has an improved durability and a method of manufacturing the multi-pane glass unit.

Additional aspects will be set forth in part in the description which follows and, in part, will be apparent from the description, or may be learned by practice of the presented embodiments of the disclosure.

According to one or more embodiments, a multi-pane glass unit includes a first outer glass pane and a second outer glass pane facing each other, a first inner glass pane between the first outer glass pane and the second outer glass pane, a first spacer located between the first outer glass pane and the first inner glass pane, the first spacer spacing the first inner glass pane apart from the first outer glass pane, and a second spacer located between the second outer glass pane and the first inner glass pane, the second spacer spacing the first inner glass pane apart from the second outer glass pane, wherein a thickness of the first inner glass pane is less than a thickness of the first outer glass pane and a thickness of the second outer glass pane, a composition of the first inner glass pane is different from a composition of the first outer glass pane and a composition of the second outer glass pane, and a circumference of the first inner glass pane is offset inward from a circumference of the first outer glass pane and a circumference of the second outer glass pane.

In some embodiments, the thickness of the first inner glass pane may be about 0.2 mm to about 1.0 mm.

In some embodiments, a thermal expansion coefficient of the first inner glass pane may be less than a thermal expansion coefficient of the first outer glass pane and a thermal expansion coefficient of the second outer glass pane.

In some embodiments, the first inner glass pane may have not undergone a strengthening process.

In some embodiments, a sunlight absorption of the first inner glass pane may be less than a sunlight absorption of the first outer glass pane and a sunlight absorption of the second outer glass pane.

In some embodiments, a sunlight transmittance of the first inner glass pane may be greater than a sunlight transmittance of the first outer glass pane and a sunlight transmittance of the second outer glass pane.

In some embodiments, a density of the first inner glass pane may be less than a density of the first outer glass pane and a density of the second outer glass pane.

In some embodiments, each of the first outer glass pane and the second outer glass pane may include soda lime glass, and the first inner glass pane may include boroaluminosilicate glass.

In some embodiments, the multi-pane glass unit may further include a second inner glass pane located between the first inner glass pane and the second outer glass pane, the second inner glass pane being spaced apart from the first inner glass pane by the second spacer, and a third spacer located between the second outer glass pane and the second inner glass pane, the third spacer spacing the second inner glass pane apart from the second outer glass pane.

According to one or more embodiments, a window includes the multi-pane glass unit, and a frame surrounding a circumference of the multi-pane glass unit.

According to one or more embodiments, a building includes the multi-pane glass unit or the window.

According to one or more embodiments, a refrigerator includes the multi-pane glass unit or the window.

According to one or more embodiments, a freezer includes the multi-pane glass unit or the window.

According to one or more embodiments, a vehicle includes the multi-pane glass unit or the window.

According to one or more embodiments, a multi-pane glass unit includes a first outer glass pane and a second outer glass pane facing each other, an inner glass pane between the first outer glass pane and the second outer glass pane, a first spacer located between the first outer glass pane and the inner glass pane, the first spacer spacing the first inner glass pane apart from the first outer glass pane, and a second spacer located between the second outer glass pane and the inner glass pane, the second spacer spacing the inner glass pane apart from the second outer glass pane, wherein a circumference of the inner glass pane is offset inward from a circumference of the first outer glass pane and a circumference of the second outer glass pane, a thickness of the inner glass pane is less than a thickness of the first outer glass pane and a thickness of the second outer glass pane, at portion of a circumference of the first spacer and a portion of a circumference of the second spacer are offset outward with respect to the circumference of the inner glass pane, and a remaining portion of the circumference of the first spacer and a remaining portion of the circumference of the second spacer are offset inward with respect to the circumference of the inner glass pane.

In some embodiments, a corner portion of the inner glass pane may protrude outward with respect to the circumference of the first spacer and the circumference of the second spacer.

In some embodiments, the circumference of the first spacer and the circumference of the second spacer may be offset inward with respect to the circumference of the first outer glass pane and the circumference of the second outer glass pane.

In some embodiments, the inner glass pane may include a first main surface and a second main surface facing each other, and an edge surface extending between the first main surface and the second main surface, and at least one of the first spacer and the second spacer may be in contact with the edge surface of the inner glass pane.

In some embodiments, the circumference of the second spacer may be misaligned with respect to the circumference of the first spacer.

According to one or more embodiments, a method of manufacturing a multi-pane glass unit includes attaching a first spacer to an inner glass pane, attaching the inner glass pane to a first outer glass pane via the first spacer to make a circumference of the inner glass pane offset inward with respect to a circumference of the first outer glass pane, attaching a second spacer to a second outer glass pane, and attaching the second outer glass pane to the inner glass pane via the second spacer to make the circumference of the inner glass pane offset inward with respect to a circumference of the second outer glass pane, wherein a thickness of the inner glass pane is less than a thickness of the first outer glass pane and a thickness of the second outer glass pane, and a composition of the inner glass pane is different from a composition of the first outer glass pane and a composition of the second outer glass pane.

According to one or more embodiments, a method of manufacturing a multi-pane glass unit includes attaching a first spacer to an inner glass pane so that at least a portion of a circumference of the first spacer is offset outward with respect to a circumference of the inner glass pane, attaching the inner glass pane to a first outer glass pane via the first spacer to make a circumference of the inner glass pane offset inward with respect to a circumference of the first outer glass pane, attaching a second spacer to a second outer glass pane, and attaching the second outer glass pane to the inner glass pane via the second spacer so that the circumference of the inner glass pane is offset inward with respect to the circumference of the second outer glass pane and at least a portion of a circumference of the second spacer is offset outward with respect to the circumference of the inner glass pane, wherein a thickness of the inner glass pane is less than a thickness of the first outer glass pane and a thickness of the second outer glass pane.

According to one or more embodiments, a method of manufacturing a multi-pane glass unit includes attaching a first spacer to a first main surface of an inner glass pane so that at least a portion of a circumference of the first spacer is offset outward with respect to a circumference of the inner glass pane, attaching a second spacer to a second main surface of the inner glass pane so that at least a portion of a circumference of the second spacer is offset outward with respect to the circumference of the inner glass pane, attaching the first outer glass pane to the first main surface of the inner glass pane via the first spacer to make the circumference of the inner glass pane offset inward with respect to the circumference of the first outer glass pane, and attaching the second outer glass pane to the second main surface of the inner glass pane via the second spacer to make the circumference of the inner glass pane is offset inward with respect to the circumference of the second outer glass pane, wherein a thickness of the inner glass pane is less than a thickness of the first outer glass pane and a thickness of the second outer glass pane.

In some embodiments, the inner glass pane may be accommodated in at least one of a groove of the first spacer and a groove of the second spacer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
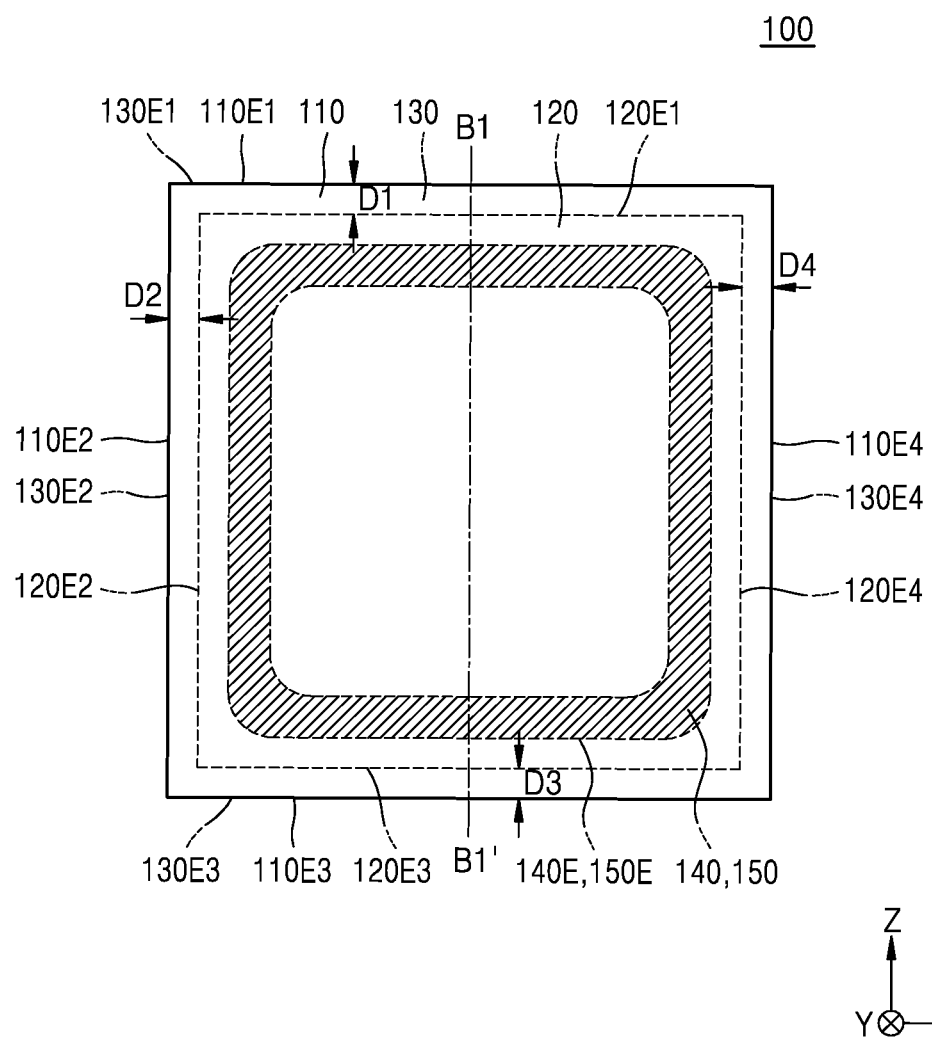
FIG. 1A is a plan view of a multi-pane glass unit according to an embodiment of the disclosure.

Hereinafter, one or more embodiments of the present disclosure will be described in detail with reference to accompanying drawings. Various modifications, additions and substitutions of the embodiment of the present disclosure are possible, and thus it will be appreciated that the disclosure is not limited to the following embodiments. The embodiments of the present disclosure are provided so that this disclosure will be thorough and complete, and will fully convey the concept of the present disclosure to one of ordinary skill in the art. Like reference numerals may denote like elements throughout the specification. Moreover, various elements and regions in the drawings are schematically illustrated. Accordingly, the disclosure is not limited by relative sizes or intervals illustrated in the attached drawings.

Figure 1B:
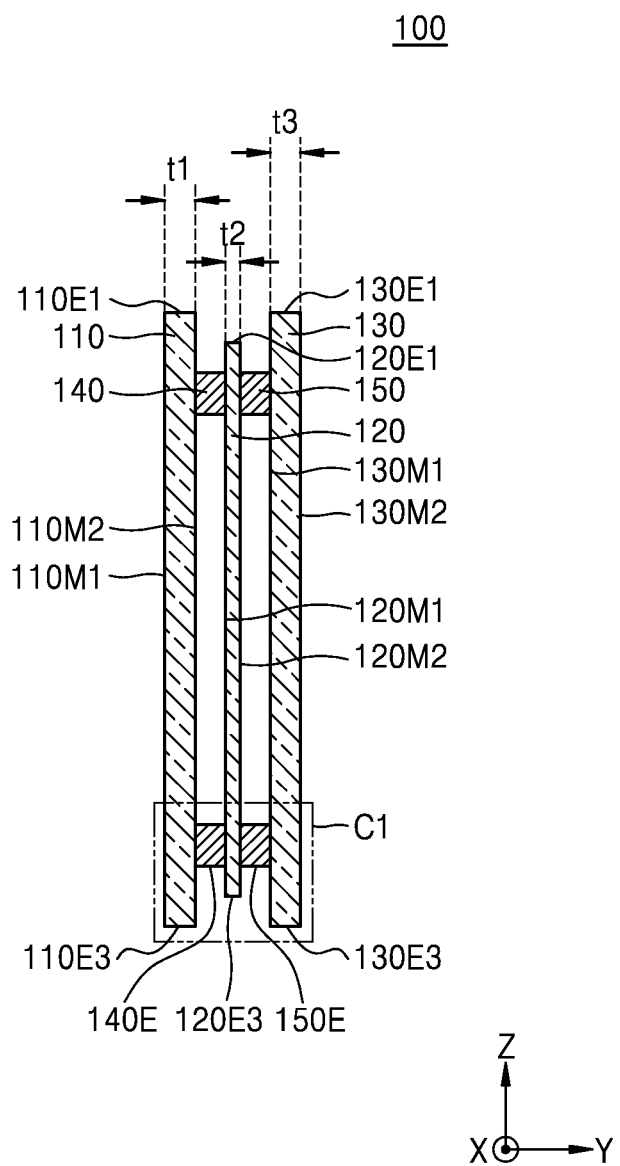
FIG. 1B is a cross-sectional view of the multi-pane glass unit taken along line B1-B1' of FIG. 1A.
Figure 1C:
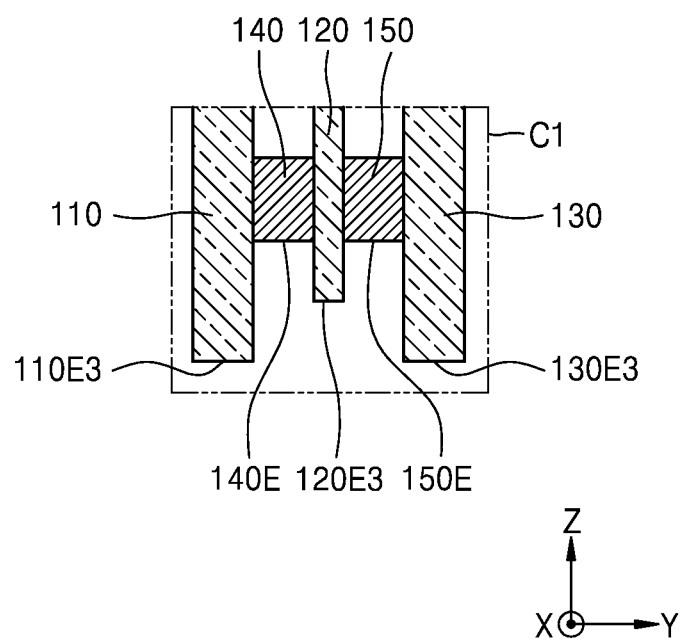
FIG. 1C is an enlarged view of a region C1 in FIG. 1B.

FIG. 1A is a plan view of a multi-pane glass unit 100 according to an embodiment of the disclosure. FIG. 1B is a cross-sectional view of the multi-pane glass unit 100 taken along line B1-B1' of FIG. 1A. FIG. 10 is an enlarged view of a region C1 in FIG. 1B.

Referring to FIGS. 1A to 10, the multi-pane glass unit 100 may include a plurality of glass panes 110, 120, and 130. For example, the multi-pane glass unit 100 may include a first glass pane 110, a second glass pane 120, and a third glass pane 130. The first and third glass panes 110 and 130 may be respectively referred to as outer glass panes, and the second glass pane 120 located between the first glass pane 110 and the third glass pane 130 may be referred to as an inner glass pane.

The first glass pane 110 may include two main surfaces 110M1 and 110M2 facing each other and a circumference surrounding the two main surfaces 110M1 and 110M2. The circumference of the first glass pane 110 may include one or more edge surfaces 110E1, 110E2, 110E3, and/or 110E4 between the two main surfaces 110M1 and 110M2. For example, each of the two main surfaces 110M1 and 110M2 of the first glass pane 110 may have a square shape, and the circumference of the first glass pane 110 may include first to fourth edge surfaces 110E1 to 110E4. In another embodiment, each of the two main surfaces 110M1 and 110M2 of the first glass pane 110 may have another shape rather than the square shape, and the number of edge surfaces included in the circumference of the first glass pane 110 may be greater or less than 4. In some embodiments, the two main surfaces 110M1 and 110M2 of the first glass pane 110 may be substantially parallel to each other. In another embodiment, the two main surfaces 110M1 and 110M2 of the first glass pane 110 may not be substantially parallel to each other.

Similarly, the third glass pane 130 may include two main surfaces 130M1 and 130M2 facing each other and a circumference surrounding the two main surfaces 130M1 and 130M2. The circumference of the third glass pane 130 may include one or more edge surfaces 130E1, 130E2, 130E3, and/or 130E4 between the two main surfaces 130M1 and 130M2. For example, each of the two main surfaces 130M1 and 130M2 of the third glass pane 130 may have a square shape and the circumference of the third glass pane 130 may include first to fourth edge surfaces 130E1 to 130E4. In another embodiment, each of the two main surfaces 130M1 and 130M2 of the third glass pane 130 may have another shape rather than the square shape, and the number of edge surfaces included in the circumference of the third glass pane 130 may be greater or less than 4. In some embodiments, the two main surfaces 130M1 and 130M2 of the third glass pane 130 may be substantially parallel to each other. In another embodiment, the two main surfaces 130M1 and 130M2 of the third glass pane 130 may not be substantially parallel to each other.

The second glass pane 120 may include two main surfaces 120M1 and 120M2 facing each other and a circumference surrounding the two main surfaces 120M1 and 120M2. The circumference of the second glass pane 120 may include one or more edge surfaces 120E1, 120E2, 120E3, and/or 120E4 between the two main surfaces 120M1 and 120M2. For example, each of the two main surfaces 120M1 and 120M2 of the second glass pane 120 may have a square shape and the circumference of the second glass pane 120 may include first to fourth edge surfaces 120E1 to 120E4. In another embodiment, each of the two main surfaces 120M1 and 120M2 of the second glass pane 120 may have another shape rather than the square shape, and the number of edge surfaces included in the circumference of the second glass pane 120 may be greater or less than 4. In some embodiments, the two main surfaces 120M1 and 120M2 of the second glass pane 120 may be substantially parallel to each other. In another embodiment, the two main surfaces 120M1 and 120M2 of the second glass pane 120 may not be substantially parallel to each other.

The first main surface 120M1 of the second glass pane 120 may face the second main surface 110M2 of the first glass pane, and the second main surface 120M2 of the second glass pane 120 may face the first main surface 130M1 of the third glass pane 130. In some embodiments, the first main surface 120M1 of the second glass pane 120 may be substantially parallel to the second main surface 110M2 of the first glass pane 110, and the second main surface 120M2 of the second glass pane 120 may be substantially parallel to the first main surface 130M1 of the third glass pane 130. In another embodiment, the first main surface 120M1 of the second glass pane 120 may not be substantially parallel to the second main surface 110M2 of the first glass pane 110, and the second main surface 120M2 of the second glass pane 120 may not be substantially parallel to the first main surface 130M1 of the third glass pane 130.

In some embodiments, a thickness t1 of the first glass pane 110 between the two main surfaces 110M1 and 110M2 of the first glass pane 110 and a thickness t3 of the third glass pane 130 between the two main surfaces 130M1 and 130M2 of the third glass pane 130 may each range from about 1 mm to about 50 mm. In some embodiments, a thickness t2 of the second glass pane 120 between the two main surfaces 120M1 and 120M2 of the second glass pane 120 may be less than the thickness t1 of the first glass pane 110 and the thickness t3 of the second glass pane 130. For example, the thickness t2 of the second glass pane 120 may be about 0.2 mm to about 1.0 mm. As the thickness t2 of the second glass pane 120 is reduced, a weight of the multi-pane glass unit 100 may be reduced and a light transmittance of the multi-pane glass unit 100 may be increased. For example, when the thickness t2 of the second glass pane 120 is about 1/10 of the thickness t1 of the first glass pane 110 and the thickness t3 of the third glass pane 130, the weight of the multi-pane glass unit 100 may be reduced by about 30% as compared with a case in which the thickness t2 of the second glass pane 120 is equal to the thickness t1 of the first glass pane 110 and the thickness t3 of the third glass pane 130. Also, as the thickness t2 of the second glass pane 120 is reduced, a thickness of a gas layer between the second main surface 110M2 of the first glass pane 110 and the first main surface 120M1 of the second glass pane 120 and a thickness of a gas layer between the second main surface 120M2 of the second glass pane 120 and the first main surface 130M 1 of the third glass pane 130 are increased, thereby improving the heat insulating performance. However, when the thickness t2 of the second glass pane 120 is reduced, it may be difficult to handle the second glass pane 120. In particular, when the thickness t2 of the second glass pane 120 is less than about 1.0 mm, a strengthening process such as a heat-strengthening or a chemical strengthening may not be performed. In some embodiments, the second glass pane 120 may not undergo the strengthening process such as the heat-strengthening or the chemical strengthening. Therefore, in this case, the thickness t2 of the second glass pane 120 may be about 1.0 mm or less. However, when the thickness t2 of the second glass pane 120 is less than about 0.2 mm, it is difficult to handle the second glass pane 120 and it may be difficult to manufacture the multi-pane glass unit 100. Therefore, the thickness t2 of the second glass pane 120 may be about 0.2 mm or greater.

When the thickness t2 of the second glass pane 120 is less than the thickness t1 of the first glass pane 110 and the thickness t3 of the third glass pane 130, the second glass pane 120 may be vulnerable to physical contact and/or impact as compared with the first glass pane 110 and the third glass pane 130. In this case, in order to protect the second glass pane 120 against the physical contact and/or impact, a circumference of the second glass pane 120 may be offset inward with respect to a circumference of the first glass pane 110 and a circumference of the third glass pane 130. For example, the first edge surface 120E1 of the second glass pane 120 may be offset inward (in −Z direction) with respect to the first edge surface 110E1 of the first glass pane 110 and the first edge surface 130E1 of the third glass pane 130. The second edge surface 120E2 of the second glass pane 120 may be offset inward (in +X direction) with respect to the second edge surface 110E2 of the first glass pane 110 and the second edge surface 130E2 of the third glass pane 130. The third edge surface 120E3 of the second glass pane 120 may be offset inward (in +Z direction) with respect to the third edge surface 110E3 of the first glass pane 110 and the third edge surface 130E3 of the third glass pane 130. The fourth edge surface 120E4 of the second glass pane 120 may be offset inward (in −X direction) with respect to the fourth edge surface 110E4 of the first glass pane 110 and the fourth edge surface 130E4 of the third glass pane 130.

In some embodiments, an offset distance D1 of the first edge surface 120E1 of the second glass pane 120 inward (−Z direction) with respect to the first edge surface 110E1 of the first glass pane 110 and the first edge surface 130E1 of the third glass pane 130, an offset distance D2 of the second edge surface 120E2 of the second glass pane 120 inward (+X direction) with respect to the second edge surface 110E2 of the first glass pane 110 and the second edge surface 130E2 of the third glass pane 130, an offset distance D3 of the third edge surface of the second glass pane 120 inward (+Z direction) with respect to the third edge surface of the first glass pane 110 and the third edge surface 130E3 of the third glass pane 130, and an offset distance D4 of the fourth edge surface of the second glass pane 120 inward (−X direction) with respect to the fourth edge surface 110E4 of the first glass pane 110 and the fourth edge surface 130E4 of the third glass pane 130 may be substantially equal to one another. In another embodiment, at least one pair of the offset distance D1 of the first edge surface 120E1 of the second glass pane 120 inward (−Z direction) with respect to the first edge surface 110E1 of the first glass pane 110 and the first edge surface 130E1 of the third glass pane 130, the offset distance D2 of the second edge surface 120E2 of the second glass pane 120 inward (+X direction) with respect to the second edge surface 110E2 of the first glass pane 110 and the second edge surface 130E2 of the third glass pane 130, the offset distance D3 of the third edge surface of the second glass pane 120 inward (+Z direction) with respect to the third edge surface of the first glass pane 110 and the third edge surface 130E3 of the third glass pane 130, and the offset distance D4 of the fourth edge surface of the second glass pane 120 inward (−X direction) with respect to the fourth edge surface 110E4 of the first glass pane 110 and the fourth edge surface 130E4 of the third glass pane 130 may be substantially different from one another. Each of the offset distances D1 to D4 may be about 0.1 mm to about 100 mm, for example, about 0.5 mm to about 10 mm, e.g., about 1 mm to about 5 mm.

In some embodiments, an area of the second glass pane 120, for example, an area of each of the two main surfaces 120M1 and 120M2 of the second glass pane 120, may be less than an area of the first glass pane 110, for example, an area of each of the two main surfaces 110M1 and 110M2 of the first glass pane 110, and an area of the third glass pane 130, for example, an area of each of the two main surfaces 130M1 and 130M2 of the third glass pane 130. In some embodiments, a length of the second glass pane 120 in the Z direction may be less than that of the first glass pane 110 and that of the third glass pane 130 in the Z direction, and a width of the second glass pane 120 in the X direction may be less than that of the first glass pane 110 and that of the third glass pane 130 in the X direction.

The first glass pane 110, the second glass pane 120, and the third glass pane 130 may each include a glass material including soda lime, borosilicate glass, aluminosilicate glass, boroaluminosilicate glass, or a combination thereof. In some embodiments, the first glass pane 110 and the third glass pane 130 may include soda lime glass that is frequently used in a window, and the second glass pane 120 may include boroaluminosilicate glass. The second glass pane 120 may include, for example, Eagle XG® available from Corning Incorporated. Table 1 below shows a composition of general soda lime glass, and Table 2 below shows a composition of an example of boroaluminosilicate glass.

TABLE 1

| | Composition (wt %) |
|---|---|
| $SiO_2$ | 72~74 |
| $Na_2O$ | 13~14 |
| CaO | 9~11 |
| $Al_2O_3$ | 1.0~2.0 |
| $K_2O$ | 0.01~0.3 |
| MgO | 0.01~4.0 |
| $Fe_2O_3$ | 0.01~0.2 |
| $TiO_2$ | 0.01~0.1 |

TABLE 2

| | Composition (wt %) |
|---|---|
| $SiO_2$ | 55~65 |
| $Al_2O_3$ | 15~20 |
| $B_2O_3$ | 5~15 |
| MgO | 0.1~5 |
| CaO | 1~10 |
| SrO | 0.5~8.0 |
| BaO | 0.01~0.5 |

When the second glass pane 120 includes boroaluminosilicate glass, even when the second glass pane 120 may have not undergone the strengthening process due to the excessively small thickness of the second glass pane 120 (e.g., 1.0 mm or less), a thermal expansion coefficient (e.g., about $3 \times 10^{-6}$/° C. to about $4 \times 10^{-6}$/° C.) of the boroaluminosilicate glass may be less than that (e.g., about $9 \times 10^{-6}$/° C. to about $1 \times 10^{-5}$/° C.) of the soda lime glass, and accordingly, thermal stress caused by the temperature difference in the second glass pane 120 may be reduced. Therefore, a probability of generating a thermal damage due to the temperature variation in the second glass pane 120 may be reduced.

When the thickness and/or composition of the second glass pane 120 are different from the thickness and/or composition of each of the first glass pane 110 and the third glass pane 130, a sunlight transmittance of the second glass pane 120 may be greater than that of the first glass pane 110 and that of the third glass pane 130. For example, the sunlight transmittance of the second glass pane 120 may be about 90% to about 95%, and the sunlight transmittance of each of the first glass pane 110 and the third glass pane 130 may be about 75% to about 85%. Therefore, the light transmittance of the multi-pane glass unit 100 may be increased as compared with a case in which the second glass pane 120 has the same thickness and composition as those of the first glass pane 110 and the third glass pane 130.

Also, when the thickness and/or composition of the second glass pane 120 are different from the thickness and/or composition of each of the first glass pane 110 and the third glass pane 130, a sunlight absorption of the second glass pane 120 may be less than that of the first glass pane 110 and that of the third glass pane 130. For example, the sunlight absorption of the second glass pane 120 may be about 0.1% to about 1.0%, and the sunlight absorption of the first glass pane 110 and the third glass pane 130 may be about 5.0% to about 15.0%. In the specification, a solar spectrum is according to the NFRC100-2010 standard. When the sunlight absorption of the second glass pane 120 is reduced, a temperature of the second glass pane 120 does not largely increase when the second glass pane 120 is exposed to sunlight, and thus, a risk of thermal damage to the second glass pane 120 may be reduced.

Also, when the composition of the second glass pane 120 is different from the composition of each of the first glass pane 110 and the third glass pane 130, a density of the second glass pane 120 may be less than that of the first glass pane 110 and that of the third glass pane 130. For example, the density of the second glass pane 120 including the boroaluminosilicate glass may be about 2.3 g/cm$^3$ to about 2.5 g/cm$^3$, and the density in each of the first glass pane 110 and the third glass pane 130 including the soda lime glass may be about 2.5 g/cm$^3$ to about 2.6 g/cm$^3$. When the density of the second glass pane 120 is reduced, the weight of the second glass pane 120 is reduced and the weight of the multi-pane glass unit 100 is also reduced.

The multi-pane glass unit 100 may further include a plurality of spacers 140 and 150 for separating the plurality of glass panes 110 to 130 from one another. The first glass pane 110 and the second glass pane 120 may be spaced apart from each other due to the first spacer 140. That is, the first spacer 140 may be located between the first glass pane 110 and the second glass pane 120. The third glass pane 130 and the second glass pane 120 may be spaced apart from each other due to the second spacer 150. That is, the second spacer 150 may be located between the third glass pane 130 and the second glass pane 120. The first spacer 140 and the second spacer 150 may include a material, for example, metal such as aluminum, or a plastic composite material such as a warm edge spacer. A space defined by the first glass pane 110, the second glass pane 120, and the first spacer 140 and a space defined by the second glass pane 120, the third glass pane 130, and the second spacer 150 may be each filled with a gas including an inert gas such as, Ar, or Kr; air; or a combination thereof. The gas may improve a heat insulating performance of the multi-pane glass unit 100.

In some embodiments, the first spacer 140 and the second spacer 150 may not protrude out of the circumference of the second glass pane 120. Moreover, in some embodiments, a circumference 140E of the first spacer 140 and a circumference 150E of the second spacer 150 may be offset inward with respect to the circumference of the second glass pane 120. For example, the circumference 140E of the first spacer 140 and the circumference 150E of the second spacer 150 may be offset inward (-Z direction) with respect to the third edge surface 120E3 of the second glass pane 120.

Figure 2A:
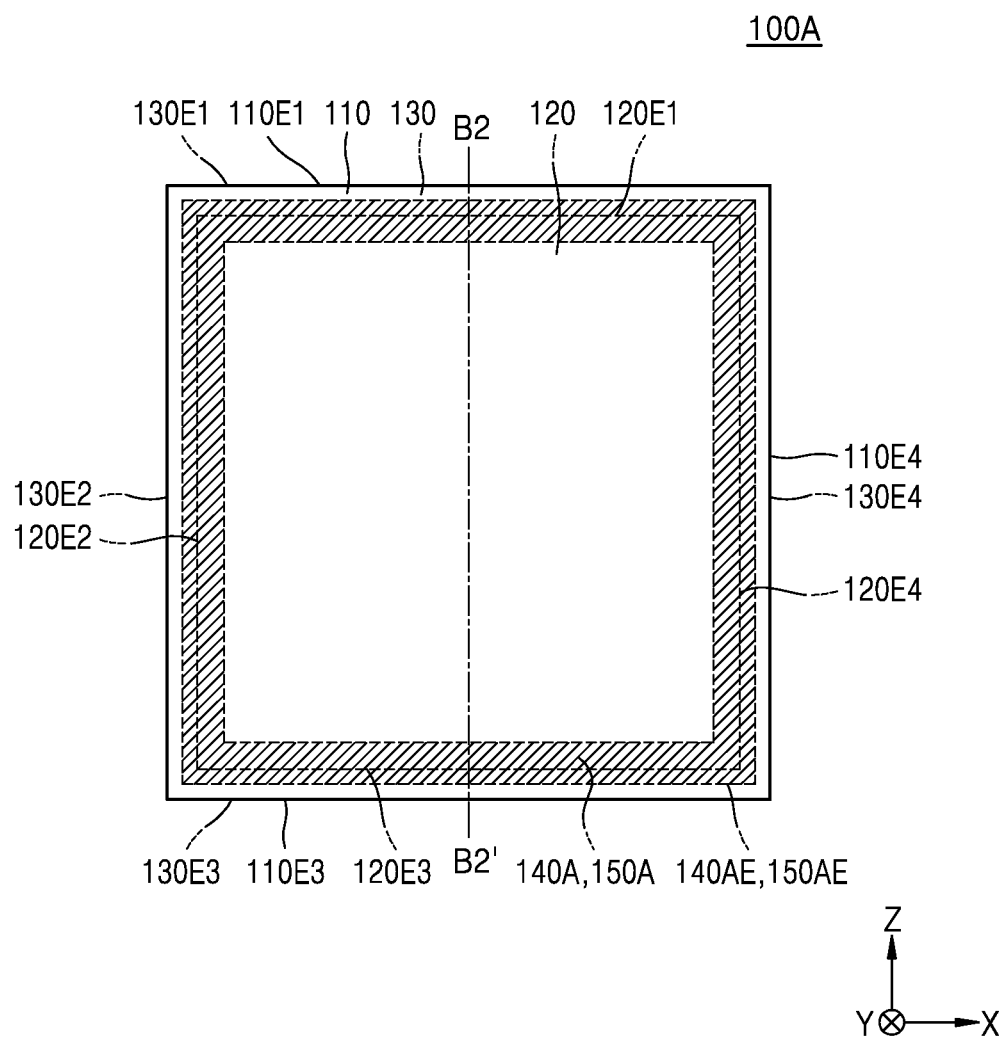
FIG. 2A is a plan view of a multi-pane glass unit according to an embodiment of the disclosure.
Figure 2B:
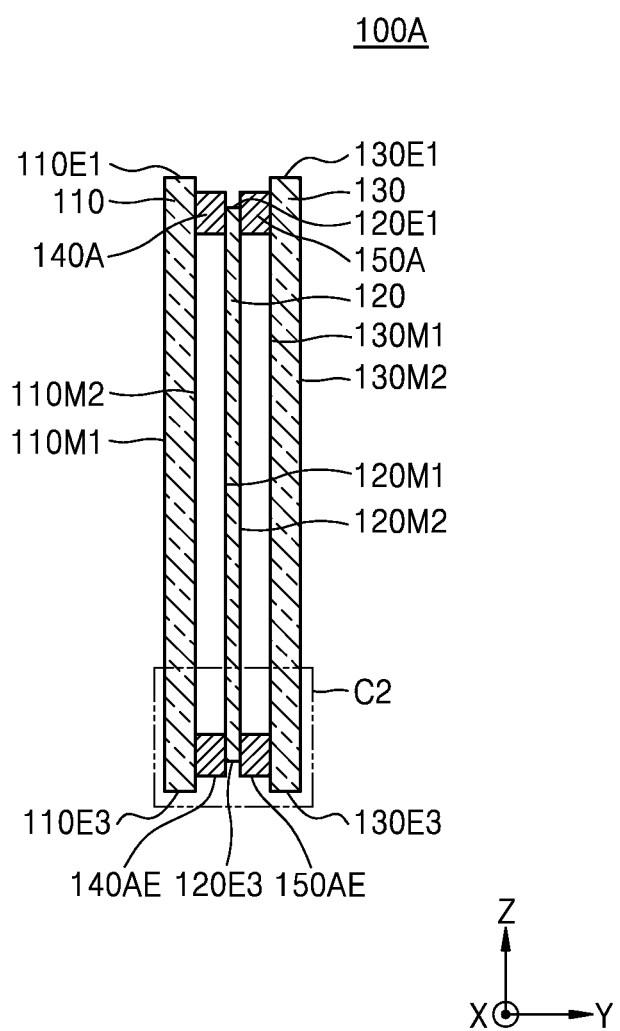
FIG. 2B is a cross-sectional view of the multi-pane glass unit taken along line B2-B2' of FIG. 2A.
Figure 2C:
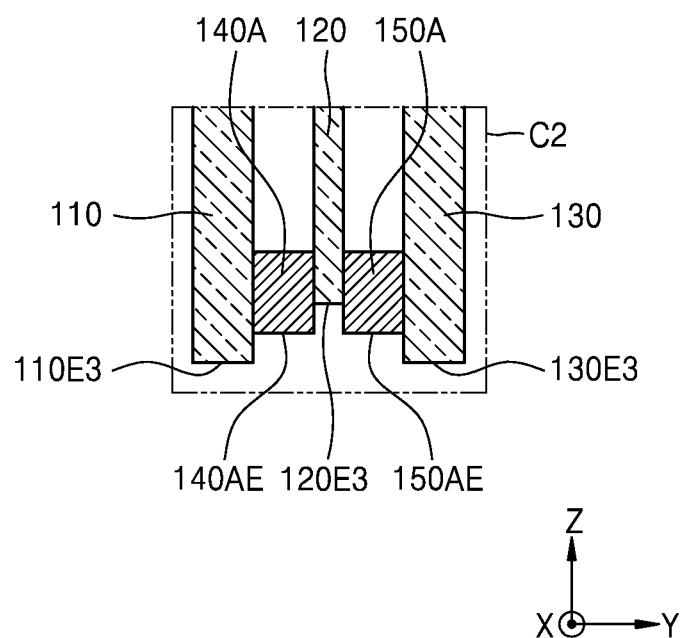
FIG. 2C is an enlarged view of a region C2 in FIG. 2B.

FIG. 2A is a plan view of a multi-pane glass unit 100A according to an embodiment of the disclosure. FIG. 2B is a cross-sectional view of the multi-pane glass unit 100A taken along line B2-B2' of FIG. 2A. FIG. 2C is an enlarged view of a region C2 in FIG. 2B. Hereinafter, differences between the multi-pane glass unit 100 shown in FIGS. 1A to 1O and the multi-pane glass unit 100A shown in FIGS. 2A to 2C will be described below.

Referring to FIG. 2A to FIG. 2C, a first spacer 140A and a second spacer 150A may partially protrude out the circumference of the second glass pane 120. That is, a circumference 140AE of the first spacer 140A and a circumference 150AE of the second spacer 150A may be offset outward with respect to the circumference of the second glass pane 120. For example, the circumference 140AE of the first spacer 140A and the circumference 150AE of the second spacer 150A may be offset outward (-Z direction) with respect to the third edge surface 120E3 of the second glass pane 120. Since the first spacer 140A and the second spacer 150A partially protrude out the circumference of the second glass pane 120, the first spacer 140A and the second spacer 150A may further protect the second glass pane 120 against damage caused by physical contact and/or impact. Therefore, the multi-pane glass unit 100A may have improved durability.

However, like in the multi-pane glass unit 100 shown in FIGS. 1A to 1O, the first spacer 140A and the second spacer 150A may be offset inward with respect to the circumference of the first glass pane 110 and the circumference of the third glass pane 130. For example, the circumference 140AE of the first spacer 140A and the circumference 150AE of the second spacer 150A may be offset inward (+Z direction) with respect to the third edge surface 110E3 of the first glass pane 110 and the third edge surface 130E3 of the third glass pane 130. A protruding portion of the first spacer 140A and a protruding portion of the second spacer 150A outside the second glass pane 120 may be spaced apart from each other.

Figure 3:
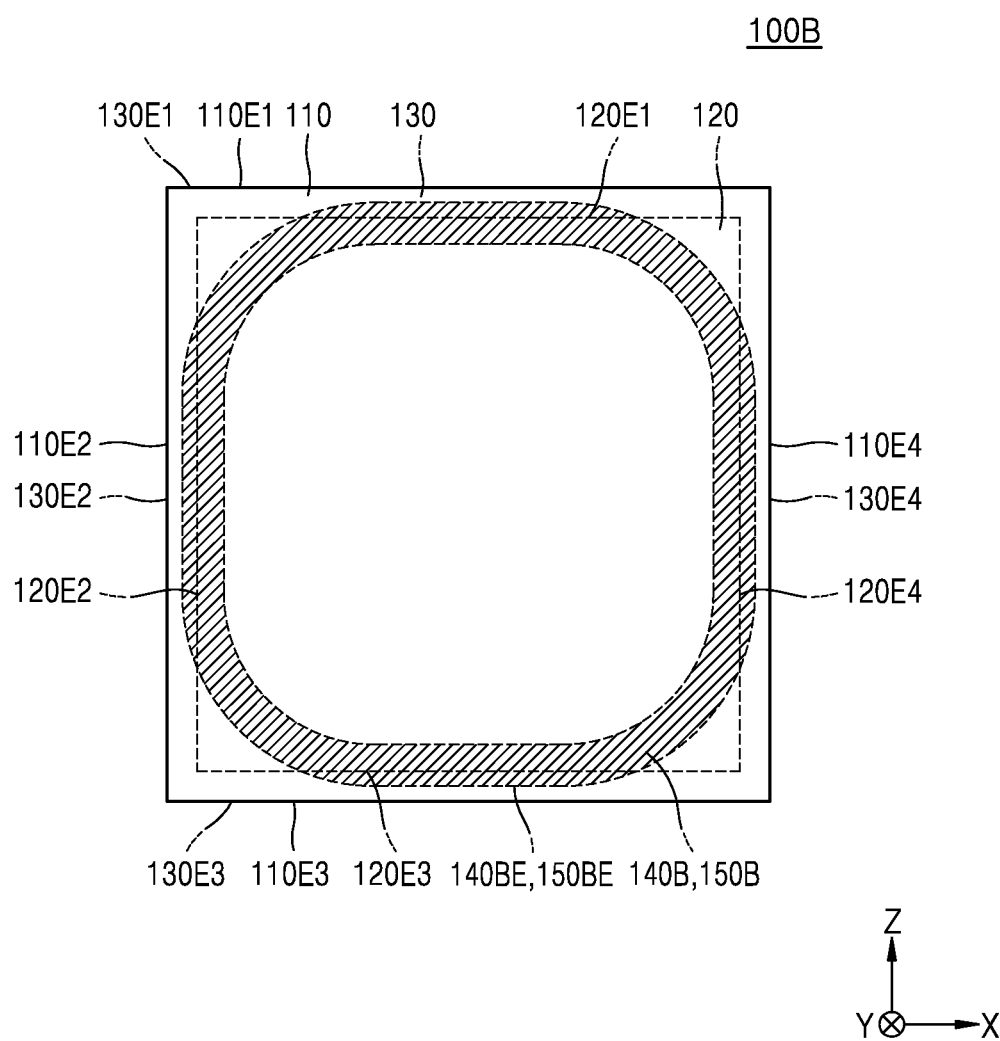
FIG. 3 is a plan view of a multi-pane glass unit according to an embodiment of the disclosure.

FIG. 3 is a plan view of a multi-pane glass unit 100B according to an embodiment of the disclosure. Hereinafter, differences between the multi-pane glass unit 100A shown in FIGS. 2A to 2C and the multi-pane glass unit 100B shown in FIG. 3 will be described below.

Referring to FIG. 3, at least a portion of a circumference 140BE of a first spacer 140B and at least a portion of a circumference 150BE of a second spacer 150B are offset outward with respect to the circumference of the second glass pane 120, but a remaining portion of the circumference 140BE and a remaining portion of the circumference 150BE may be offset inward with respect to the circumference of the second glass pane 120. For example, when it is difficult to form the first spacer 140B and the second spacer 150B to have sharp corners, a corner portion of the circumference 140BE of the first spacer 140B and a corner portion of the circumference 150BE of the second spacer 150B are offset with respect to the circumference of the second glass pane 120, but a remaining portion of the circumference 140BE of the first spacer 140B and a remaining portion of the circumference 150BE of the second spacer 150B may be offset outward with respect to the circumference of the second glass pane 120. That is, a corner portion of the second glass pane 120 may protrude out from the circumference 140BE of the first spacer 140B and the circumference 150BE of the second spacer 150B.

Figure 4:
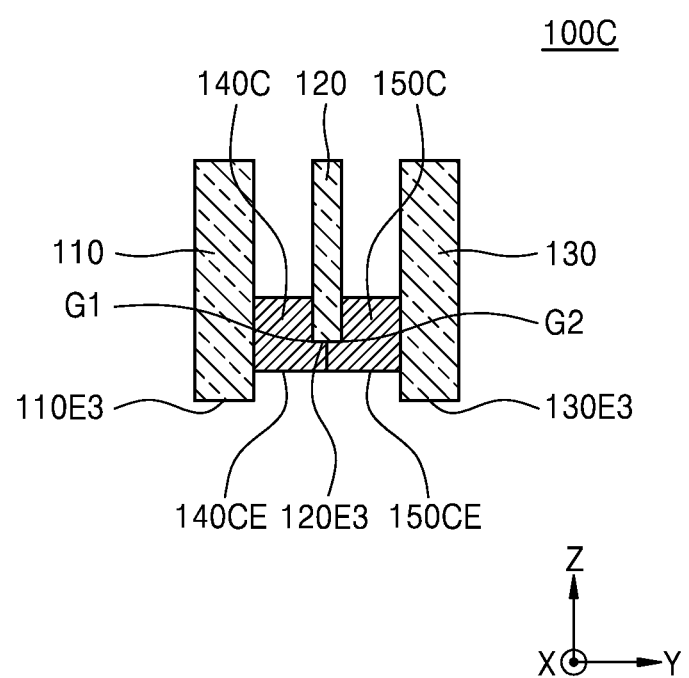
FIG. 4 is an enlarged cross-sectional view of a multi-pane glass unit according to an embodiment of the disclosure.

FIG. 4 is an enlarged cross-sectional view of a multi-pane glass unit 100C according to an embodiment of the disclosure. Hereinafter, differences between the multi-pane glass unit 100A shown in FIGS. 2A to 2C and the multi-pane glass unit 100C shown in FIG. 4 will be described below.

Referring to FIG. 4, a protruding portion of a first spacer 140C and a protruding portion of a second spacer 150C out of the circumference of the second glass pane 120 may be in contact with each other. In some embodiments, the protruding portion of the first spacer 140C and the protruding portion of the second spacer 150C out of the circumference of the second glass pane 120 may be in contact with the circumference of the second glass pane 120. For example, the first spacer 140C and the second spacer 150C may be in contact with the third edge surface 120E3 of the second glass pane 120. In some embodiments, the second glass pane 120 may be accommodated in a groove G1 in the first spacer 140C and in a groove G2 of the second spacer 150C. Since the circumference of the second glass pane 120 may be protected by the first spacer 140C and the second spacer 150C, the first spacer 140C and the second spacer 150C may further protect the second glass pane 120 against the damage caused by the physical contact and/or impact. Therefore, the multi-pane glass unit 100C may have improved durability.

Figure 5:
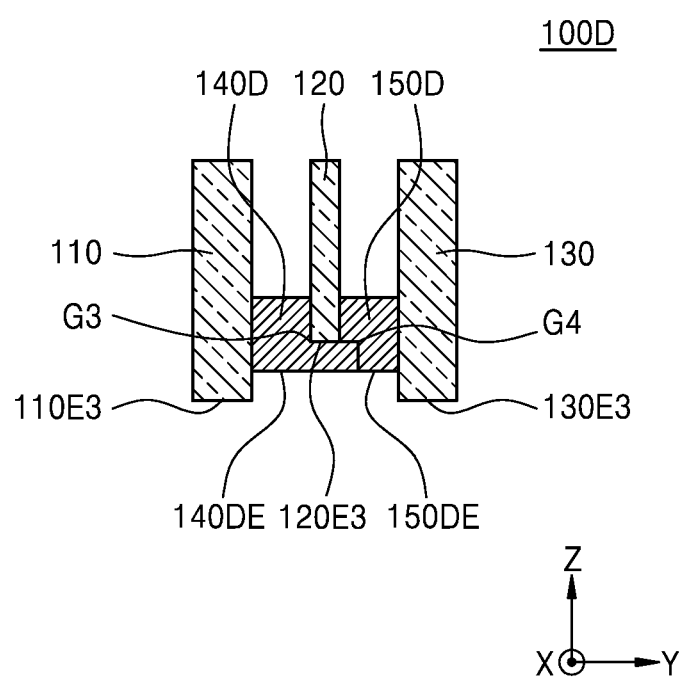
FIG. 5 is an enlarged cross-sectional view of a multi-pane glass unit according to an embodiment of the disclosure.

FIG. 5 is an enlarged cross-sectional view of a multi-pane glass unit 100D according to an embodiment of the disclosure. Hereinafter, differences between the multi-pane glass unit 100C shown in FIG. 4 and the multi-pane glass unit 100D shown in FIG. 5 will be described below.

Referring to FIG. 5, a first spacer 140D may be in contact with the third edge surface 130E3 of the second glass pane 120, but a second spacer 150D may be spaced apart from the third edge surface 120E3 of the second glass pane 120. In some embodiments, the second glass pane 120 may be accommodated in a groove G3 in the first spacer 140D and the first spacer 140D may be accommodated in a groove G4 in the second spacer 150D. In another embodiment, the second spacer 150D may not include the groove G4.

Figure 6:
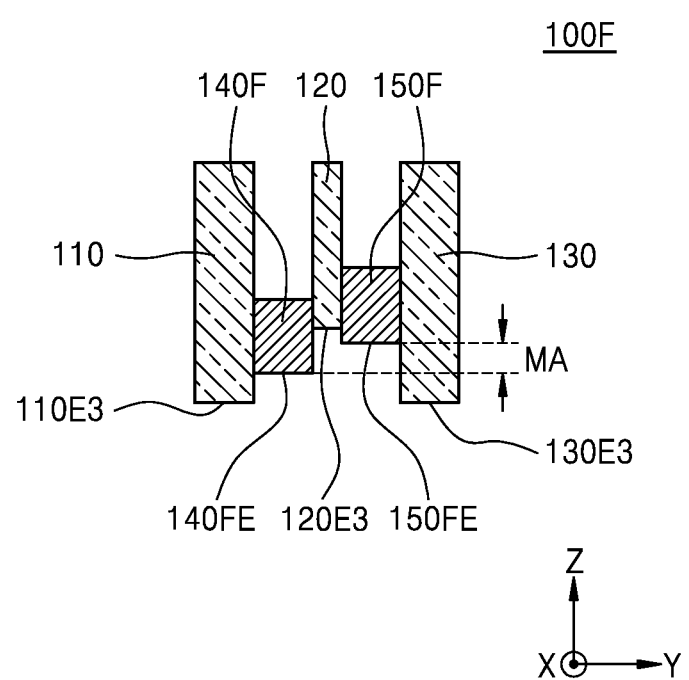
FIG. 6 is an enlarged cross-sectional view of a multi-pane glass unit according to an embodiment of the disclosure.

FIG. 6 is an enlarged cross-sectional view of a multi-pane glass unit 100F according to an embodiment of the disclosure. Hereinafter, differences between the multi-pane glass unit 100A shown in FIGS. 2A to 2C and the multi-pane glass unit 100F shown in FIG. 6 will be described below.

Referring to FIG. 6, a circumference 150FE of a second spacer 150F may be misaligned with respect to a circumference 140FE of the first spacer 140F. For example, the circumference 150FE of the second spacer 150F may be offset in the Z direction with respect to the circumference 140FE of the first spacer 140F. A misalignment distance MA by which the circumference 150FE of the second spacer 150F is shifted from the circumference 140FE of the first spacer 140F may be, for example, about 0.1 mm to about 10 mm, e.g., about 0.5 mm to about 5 mm. For example, when the second spacer 150F is attached to the third glass pane 130 or when the third glass pane 130 to which the second spacer 150F is attached is attached to the second glass pane 120, misalignment may occur.

Figure 7:
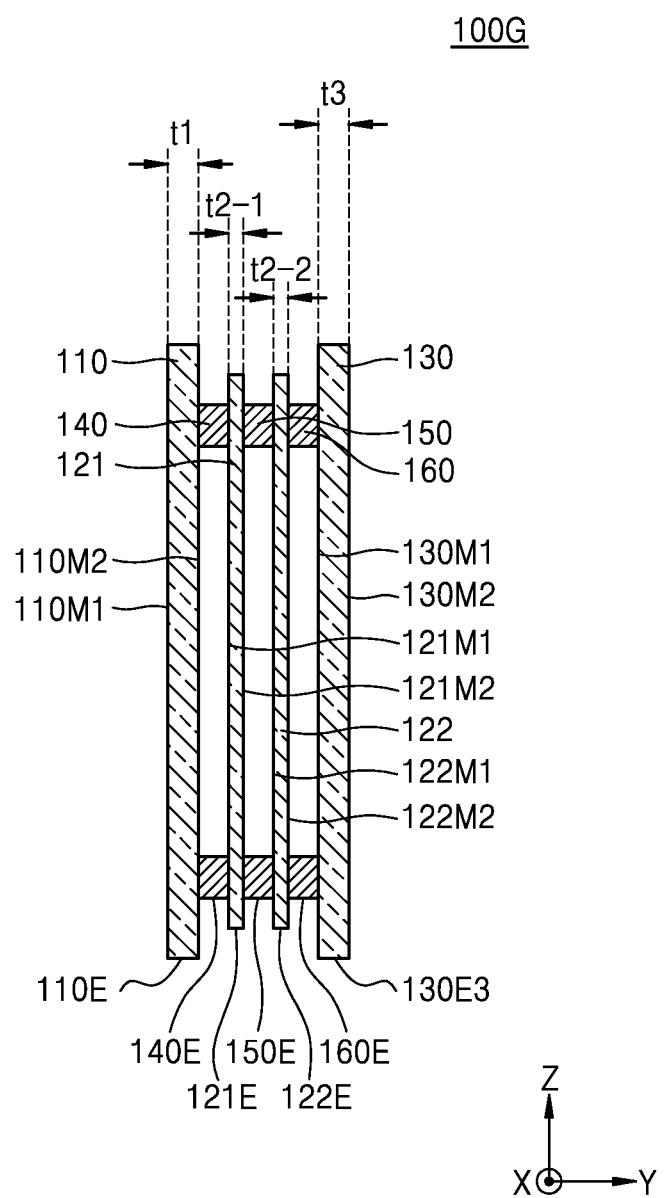
FIG. 7 is a cross-sectional view of a multi-pane glass unit according to an embodiment of the disclosure.

FIG. 7 is a cross-sectional view of a multi-pane glass unit 100G according to an embodiment of the disclosure. Hereinafter, differences between the multi-pane glass unit 100 shown in FIGS. 1A to 10 and the multi-pane glass unit 100G shown in FIG. 7 will be described below.

Referring to FIG. 7, the multi-pane glass unit 100G may include the first outer glass pane 110 and the second outer glass pane 130 facing each other, and a plurality of (first and second?) inner glass panes 121 and 122 between the first outer glass pane 110 and the second outer glass pane 130. The first inner glass pane 121 may include a first main surface 121M1 facing the second main surface 110M2 of the first outer glass pane 110, a second main surface 121M2 facing a first main surface 122M1 of the second inner glass pane 122, and a circumference 121E extending between the first main surface 121M1 and the second main surface 121M2. The second inner glass pane 122 may include the first main surface 122M1 facing the second main surface 121M2 of the first inner glass pane 121, a second main surface 122M2 facing the first main surface 130M1 of the second outer glass pane 130, and a circumference 122E extending between the first main surface 122M 1 and the second main surface 122M2. A thickness t2-1 of the first inner glass pane 121 between the first main surface 121M1 and the second main surface 121M2 and a thickness t2-2 of the second inner glass pane 122 between the first main surface 122M1 and the second main surface 122M2 may be less than the thickness t1 of the first outer glass pane 110 and the thickness t3 of the second outer glass pane 130. Descriptions about the first inner glass pane 121 and the second inner glass pane 122 may be the same as the descriptions about the second glass pane 120 provided above with reference to FIGS. 1A to 6.

The multi-pane glass unit 100G may further include the first spacer 140 located between the first outer glass pane 110 and the first inner glass pane 121 for spacing the first inner glass pane 121 apart from the first outer glass pane 110, the second spacer 150 located between the first inner glass pane 121 and the second inner glass pane 122 for spacing the second inner glass pane 122 apart from the first inner glass pane 121, and a third spacer 160 located between the second outer glass pane 130 and the second inner glass pane 122 for spacing the second inner glass pane 122 apart from the second outer glass pane 130. As the number of the inner glass panes increases, the heat insulation, soundproof, and/or anti-dew condensation performances may be improved. In addition, the first and second inner glass panes 121 and 122 that are thinner than the outer glass panes 110 and 130 are used, and thus, the weight of the multi-pane glass unit 100G may be prevented from excessively increasing even when the number of the inner glass panes increases.

Figure 8:
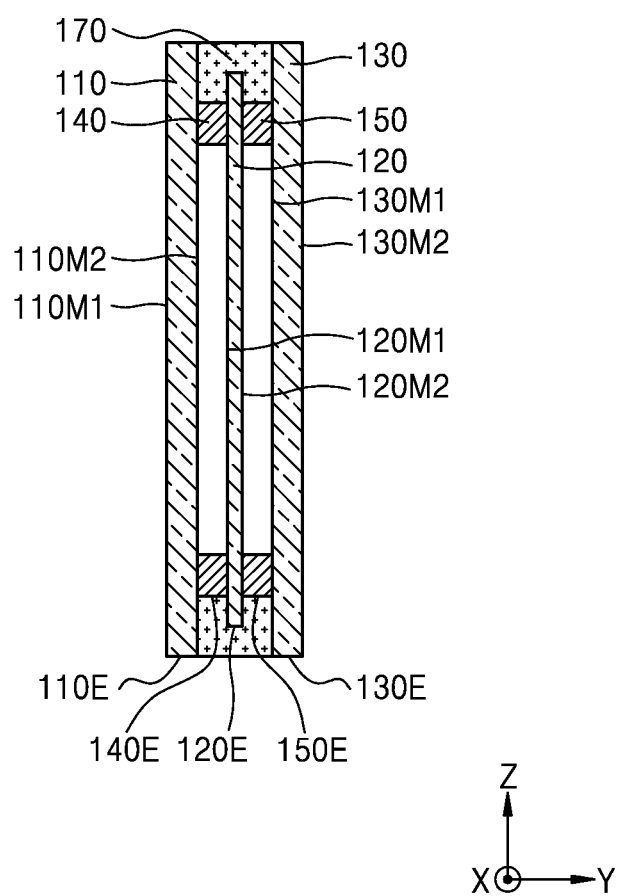
FIG. 8 is a cross-sectional view of a multi-pane glass unit according to an embodiment of the disclosure.

FIG. 8 is a cross-sectional view of a multi-pane glass unit 100H according to an embodiment of the disclosure. Hereinafter, differences between the multi-pane glass unit 100 shown in FIGS. 1A to 10 and the multi-pane glass unit 100H shown in FIG. 8 will be described below.

Referring to FIG. 8, the multi-pane glass unit 100H may further include a sealing material 170. The sealing material 170 surrounds the circumference 140E of the first spacer 140 and the circumference 150E of the second spacer 150 and may at least partially fill a space between the first glass pane 110 and the third glass pane 130. The sealing material 170 may prevent degradation of the heat insulating performance of the multi-pane glass unit 100H caused by moisture that may infiltrate into a space defined by the first glass pane 110, the second glass pane 120, and the first spacer 140 or a space defined by the second glass pane 120, the third glass pane 130, and the second spacer 150 or the gas in the space defined by the first glass pane 110, the second glass pane 120, and the first spacer 140 or the space defined by the second glass pane 120, the third glass pane 130, and the second spacer 150 leaks out of the multi-pane glass unit 100H. The sealing material 170 may include, for example, a silicon resin or a polysulfide resin.

Figure 9A:
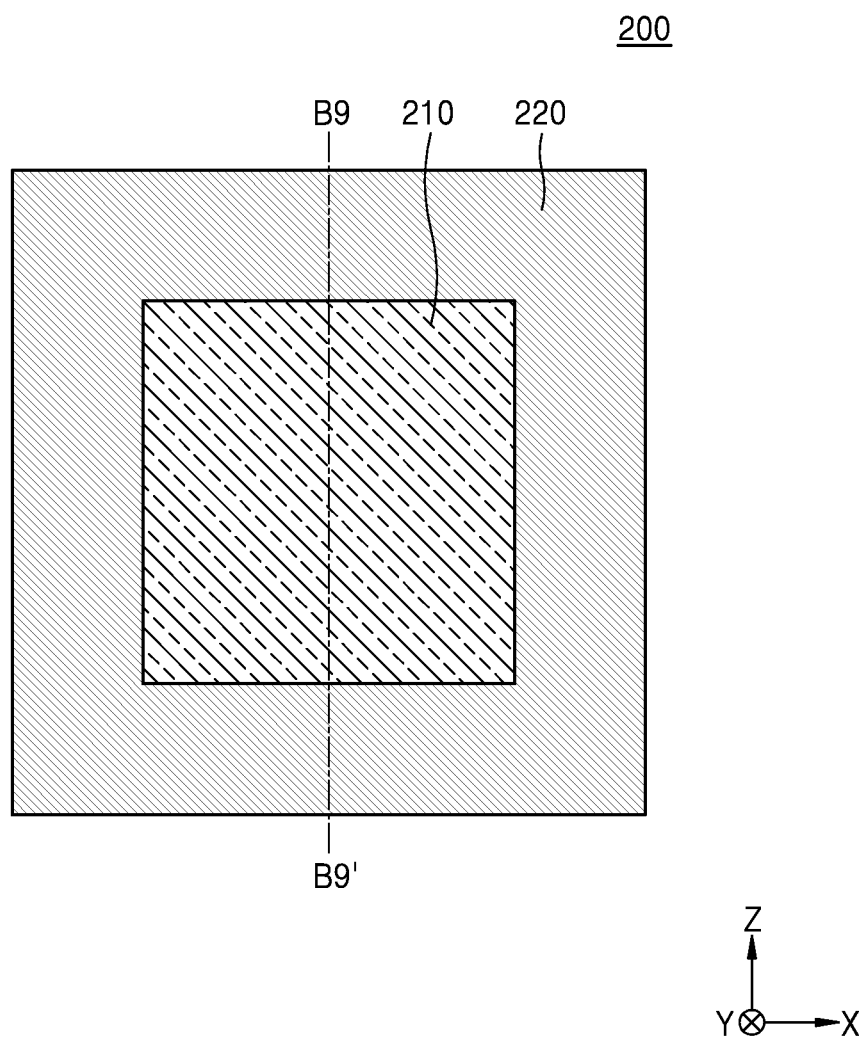
FIG. 9A is a plan view of a window according to an embodiment of the disclosure.
Figure 9B:
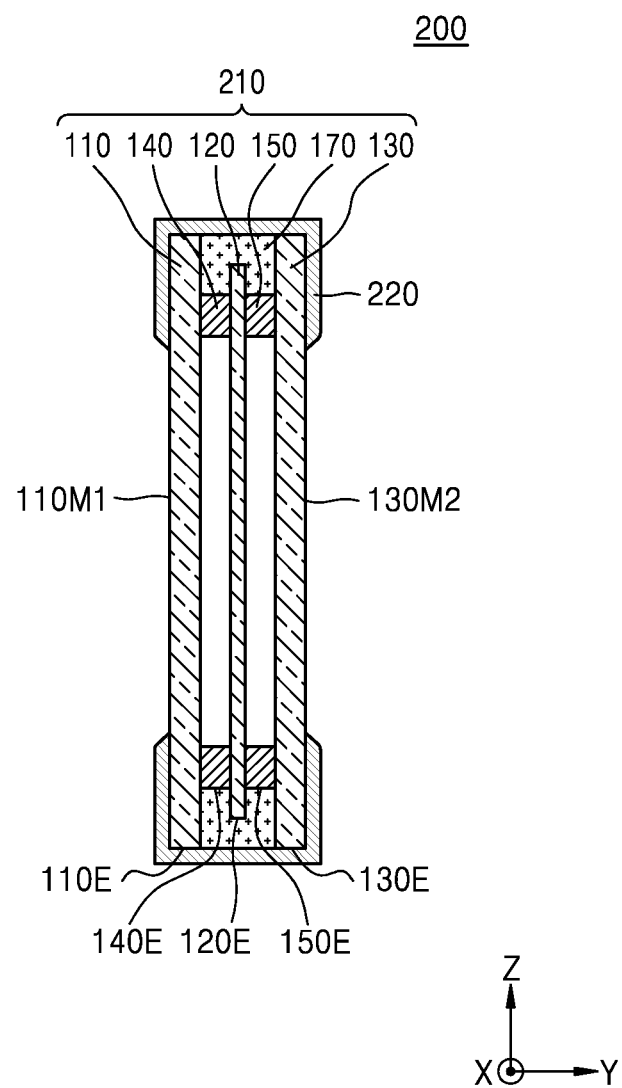
FIG. 9B is a cross-sectional view of the window taken along line B9-B9' of FIG. 9A.
Figure 10A:
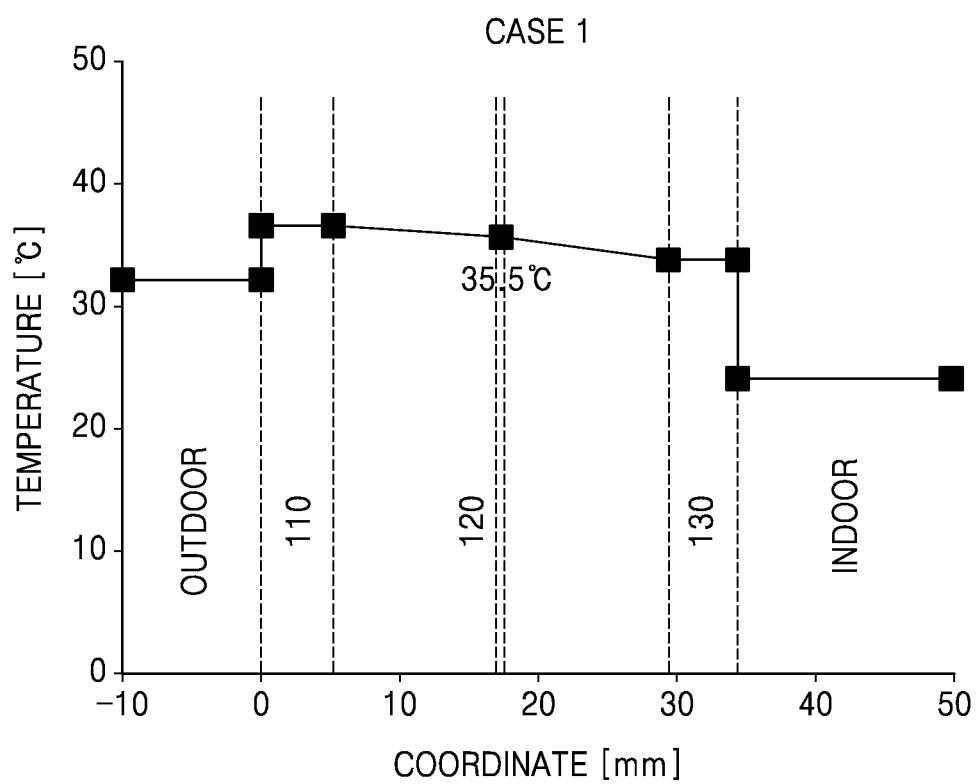
FIGS. 10A to 10F are diagrams showing results of temperature profile simulations for case 1 to case 6, respectively, when exposed to sunlight.
Figure 10B:
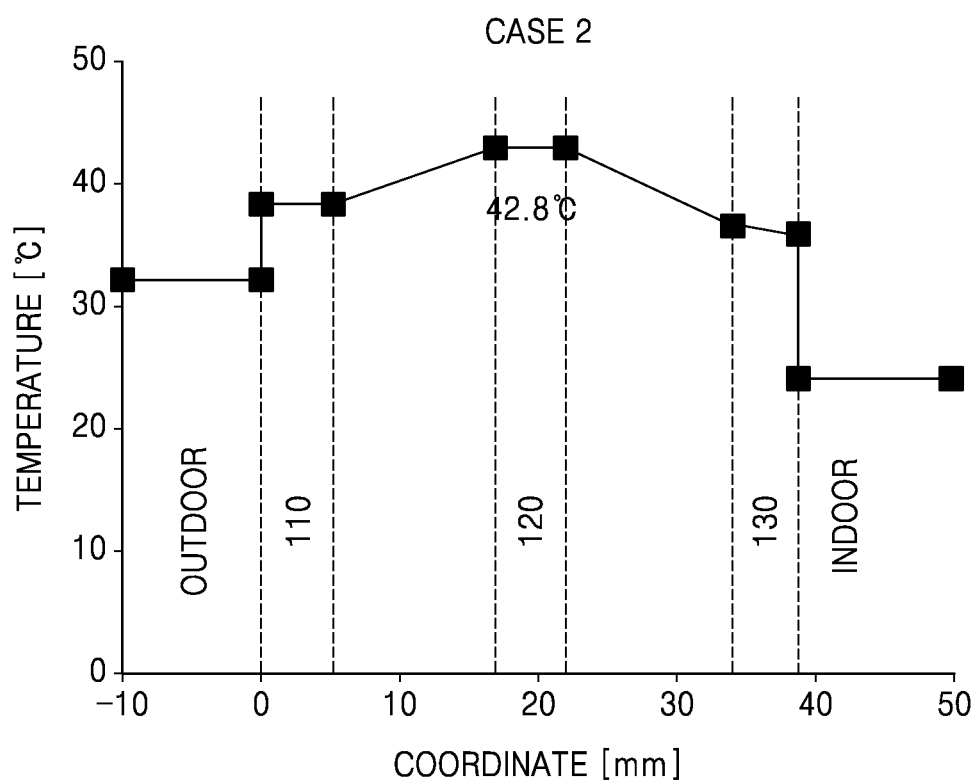
Figure 10C:
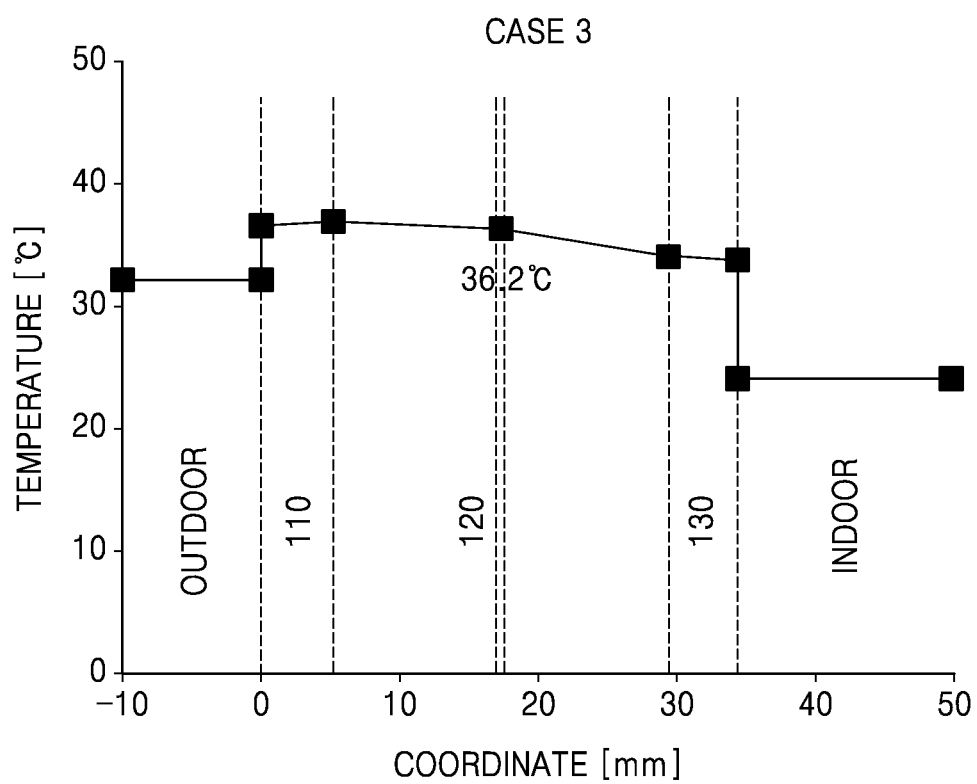
Figure 10D:
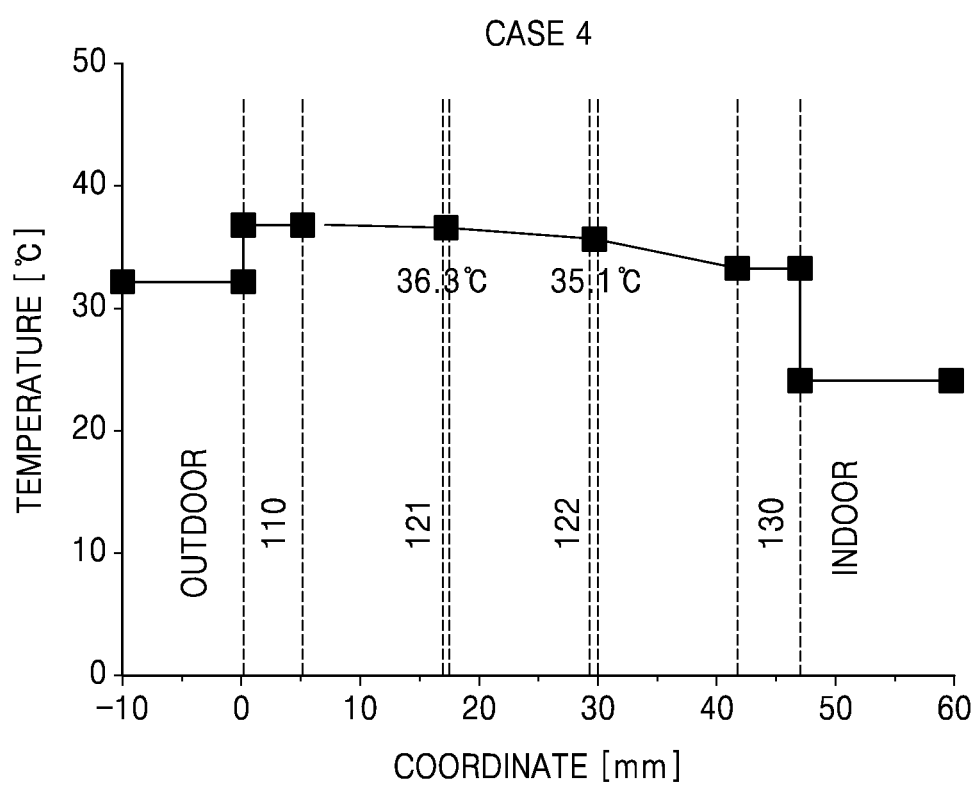
Figure 10E:
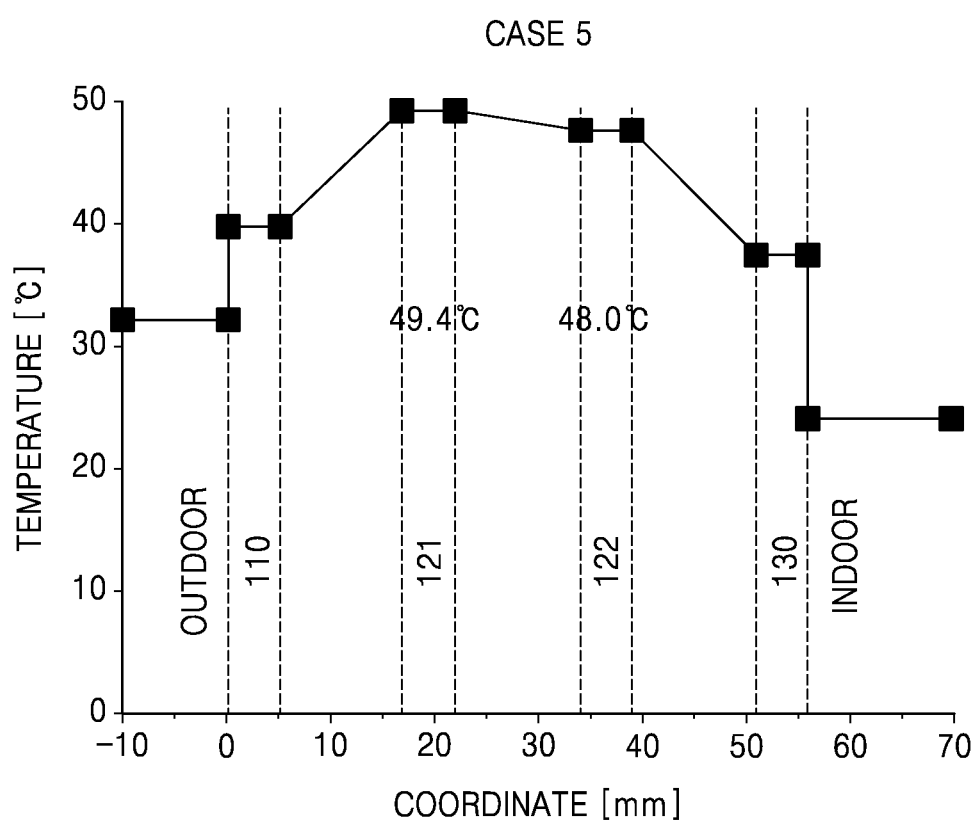
Figure 10F:
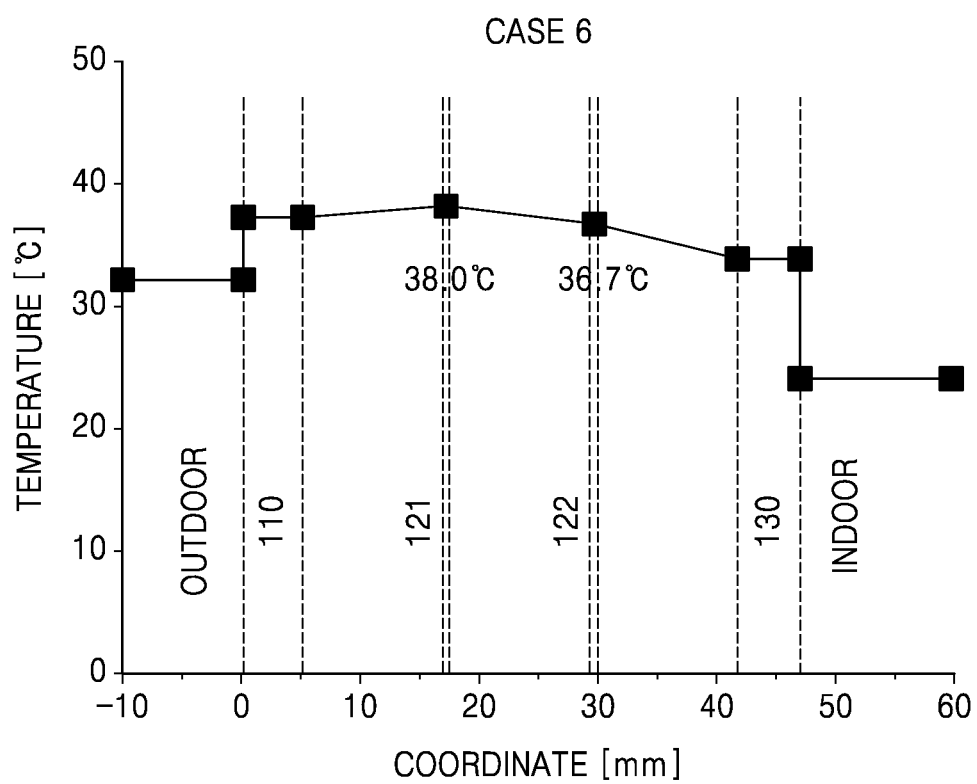

FIG. 9A is a plan view of a window 200 according to an embodiment of the disclosure. FIG. 9B is a cross-sectional view of the window 200 taken along line B9-B9' of FIG. 9A.

Referring to FIGS. 9A and 9B, the window 200 may include a multi-pane glass unit 210 and a frame 220 surrounding the multi-pane glass unit 210. The multi-pane glass unit 210 may include one of the multi-pane glass units 100 to 100H described above with reference to FIGS. 1A to 8. In some embodiments, the frame 220 may cover a circumferential portion of the first main surface 110M1 of the first glass pane 110 and a circumferential portion of the second main surface 130M2 of the third glass pane 130. On the other hand, the frame 220 may not cover a central portion of the first main surface 110M1 of the first glass pane 110 and a central portion of the second main surface 130M2 of the third glass pane 130.

The multi-pane glass units 100 to 100H described above with reference to FIGS. 1A to 8 and the window 200 described above with reference to FIG. 9 may be used for heat insulation, soundproof, and/or anti-dew condensation in buildings, transportation means such as vehicles, trains, or airplanes, electronic devices such as refrigerators or freezers, etc.

Hereinafter, one or more embodiments of the disclosure will be described with reference to six cases provided in table 3 below.

TABLE 3

| | kind of glass | thickness of glass (mm) |
|---|---|---|
| Case 1 (first embodiment) | first glass pane | soda lime | 5 |
| | inner glass pane (second glass pane) | boroaluminosilicate | 0.5 |
| | third glass pane | soda lime | 5 |
| Case 2 (first comparative example) | first glass pane | soda lime | 5 |
| | inner glass pane (second glass pane) | soda lime | 5 |
| | third glass pane | soda lime | 5 |
| Case 3 (second comparative example) | first glass pane | soda lime | 5 |
| | inner glass pane (second glass pane) | soda lime | 0.5 |
| | third glass pane | soda lime | 5 |
| Case 4 (second embodiment) | first glass pane | soda lime | 5 |
| | first inner glass pane | boroaluminosilicate | 0.5 |
| | second inner glass pane | boroaluminosilicate | 0.5 |
| | third glass pane | soda lime | 5 |
| Case 5 (third comparative example) | first glass pane | soda lime | 5 |
| | first inner glass pane | soda lime | 5 |
| | second inner glass pane | soda lime | 5 |
| | third glass pane | soda lime | 5 |
| Case 6 (fourth comparative example) | first glass pane | soda lime | 5 |
| | first inner glass pane | soda lime | 0.5 |
| | second inner glass pane | soda lime | 0.5 |
| | third glass pane | soda lime | 5 |

Table 4 below illustrates simulation results of sunlight transmittance and visible light transmittance for case 1 to case 6.

TABLE 4

| | Sunlight transmittance (%) | Visible light transmittance (%) |
|---|---|---|
| Case 1 (first embodiment) | 62.7 | 74.9 |
| Case 2 (first comparative example) | 56.4 | 72.8 |
| Case 3 (second comparative example) | 62.3 | 74.2 |
| Case 4 (second embodiment) | 58.5 | 69.9 |
| Case 5 (third comparative example) | 47.6 | 66.1 |
| Case 6 (fourth comparative example) | 57.5 | 68.5 |

Referring to Table 4 above, case 1 (first embodiment) shows higher sunlight transmittance and higher visible light transmittance than those of case 2 (first comparative example) and case 3 (second comparative example), and case 4 (second embodiment) shows higher sunlight transmittance and higher visible light transmittance than those of case 5 (third comparative example) and case 6 (fourth comparative example). That is, in the multi-pane glass units according to one or more embodiments of the disclosure, a thin glass pane including boroaluminosilicate is used as the second glass pane instead of the thick glass pane including soda lime, and thus, the sunlight transmittance and the visible light transmittance may be improved. Therefore, the multi-pane glass units according to one or more embodiments of the disclosure may be more transparent.

FIGS. 10A to 10F are diagrams showing results of temperature profile simulations for case 1 to case 6, respectively, when exposed to sunlight.

Referring to FIGS. 10A to 10F, case 1 (first embodiment) shows lower temperature of the inner glass pane (second glass pane) 120 than those of case 2 (first comparative example) and case 3 (second comparative example), and case 4 (second embodiment) shows lower temperatures of the inner glass panes 121 and 122 than those of case 5 (third comparative example) and sixth case (fourth comparative example). That is, heat-insulation window units according to one or more embodiments of the disclosure may have a lower probability of causing thermal damage to the inner glass pane 120 or 121 and 122, because the temperature of the inner glass pane 120 or inner glass panes 121 and 122 is less increased when they are exposed to sunlight.

Table 5 below shows simulation results with regard to a difference between temperatures of the central portion and the circumference of the second glass pane and maximum principal stress generated in the second glass pane due to the temperature difference.

TABLE 5

| | Temperature difference (° C.) | Maximum principal stress (MPa) |
|---|---|---|
| Case 1 (first embodiment) | 1.76 | 0.441 |
| Case 2 (first comparative example) | 6.54 | 3.74 |
| Case 3 (second comparative example) | 2.34 | 1.33 |

Referring to Table 5 above, case 1 (first embodiment) shows less temperature difference and less maximum principal stress as compared with case 2 (first comparative example) and case 3 (second comparative example). Therefore, case 1 (first embodiment) shows a less probability of generating thermal damage as compared with case 2 (first comparative example) and case 3 (second comparative example). That is, in the multi-pane glass units according to one or more embodiments of the disclosure, a thin glass pane including boroaluminosilicate is used as the second glass pane instead of the thick glass pane including soda lime, and thus, a risk of generating thermal damage may be reduced.

Figure 11A:
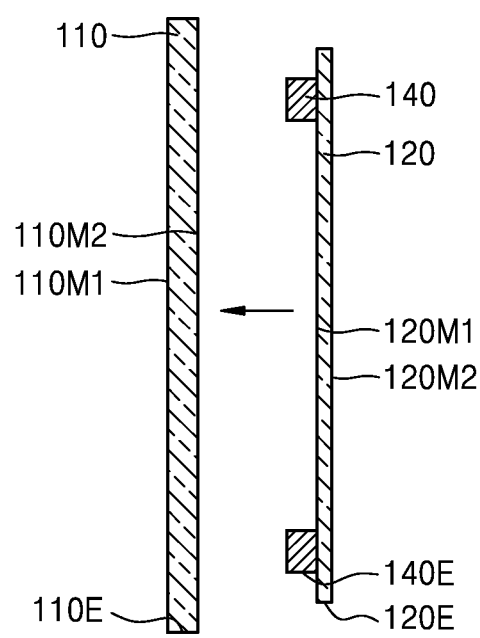
FIGS. 11A and 11B are cross-sectional views for illustrating a method of manufacturing a multi-pane glass unit according to an embodiment of the disclosure.
Figure 11B:
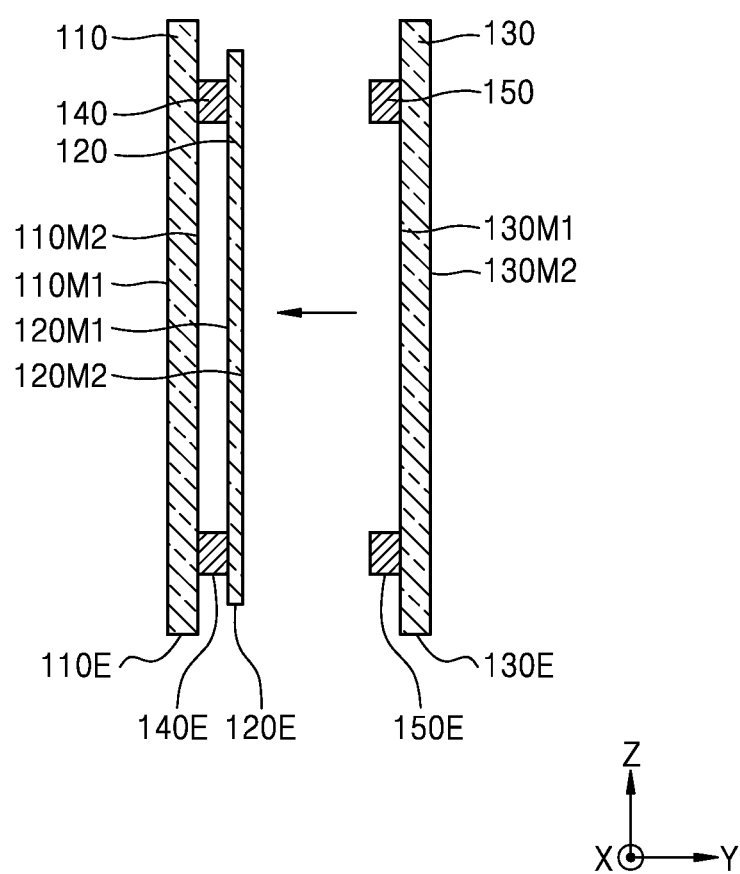

FIGS. 11A and 11B are cross-sectional views for illustrating a method of manufacturing a multi-pane glass unit according to an embodiment of the disclosure.

Referring to FIG. 11A, the first spacer 140 may be attached to the first main surface 120M 1 of the inner glass pane 120, so that the circumference 140E of the first spacer 140 may be offset inward with respect to the circumference 120E of the inner glass pane 120. Next, the inner glass pane 120 may be attached to the second main surface 110M2 of the first outer glass pane 110 via the first spacer 140 so that the circumference 120E of the inner glass pane 120 may be offset inward with respect to the circumference 110E of the first outer glass pane 110.

Referring to FIG. 11B, the second spacer 150 may be attached to the first main surface 130M1 of the second outer glass pane 130 so that the circumference 150E of the second spacer 150 may be offset inward with respect to the circumference 130E of the second outer glass pane 130. Next, the second outer glass pane 130 may be attached to the second main surface 120M2 of the inner glass pane 120 via the second spacer 150, so that the circumference 120E of the inner glass pane 120 may be offset inward with respect to the circumference 130E of the second outer glass pane 130 and the circumference 150E of the second spacer 150 may be offset inward with respect to the circumference 120E of the inner glass pane 120. As such, the multi-pane glass unit 100 described above with reference to FIGS. 1A to 10 may be manufactured.

In some embodiments, the sealing material 170 may be further provided on the circumference 140E of the first spacer 140 and the circumference 150E of the second spacer 150 in order to manufacture the multi-pane glass unit 100H described above with reference to FIG. 8.

Figure 12A:
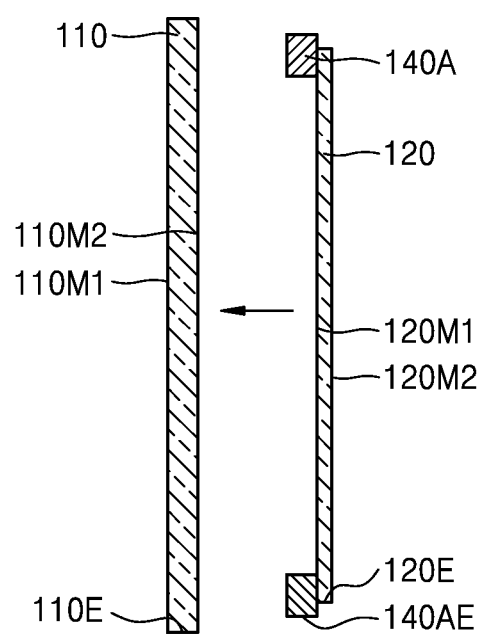
FIGS. 12A and 12B are cross-sectional views for illustrating a method of manufacturing a multi-pane glass unit according to an embodiment of the disclosure.
Figure 12B:
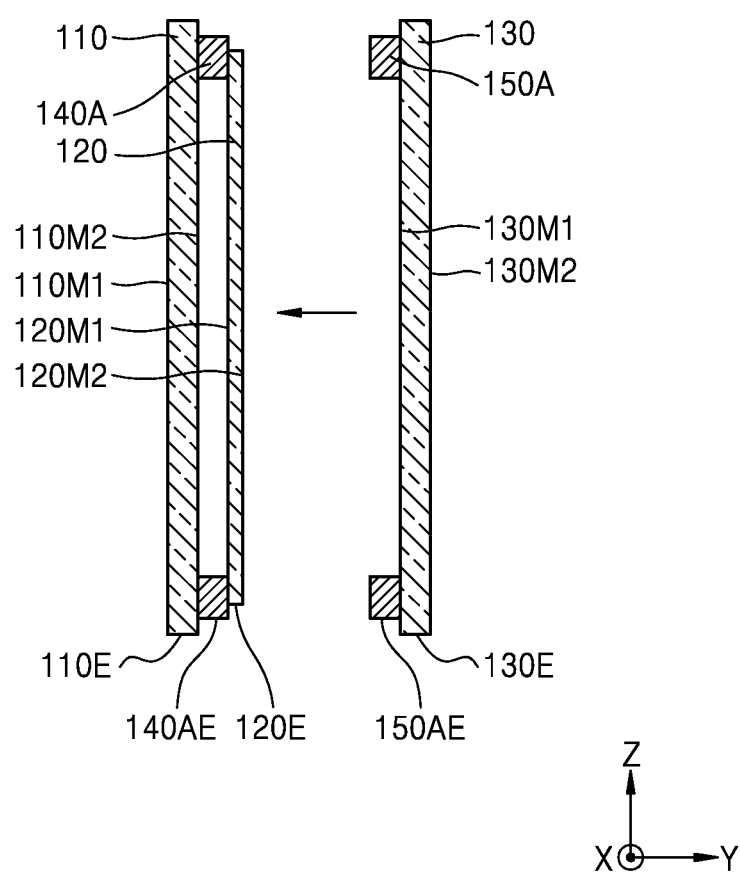

FIGS. 12A and 12B are cross-sectional views for illustrating a method of manufacturing a multi-pane glass unit according to an embodiment of the disclosure.

Referring to FIG. 12A, the first spacer 140A may be attached to the first main surface 120M1 of the inner glass pane 120, so that the circumference 140AE of the first spacer 140A may be offset outward with respect to the circumference 120E of the inner glass pane 120. Next, the inner glass pane 120 may be attached to the second main surface 110M2 of the first outer glass pane 110 via the first spacer 140A so that the circumference 140AE of the first spacer 140A may be offset inward with respect to the circumference 110E of the first outer glass pane 110.

Referring to FIG. 12B, the second spacer 150A may be attached to the first main surface 130M1 of the second outer glass pane 130 so that the circumference 150AE of the second spacer 150A may be offset inward with respect to the circumference 130E of the second outer glass pane 130. Next, the second outer glass pane 130 may be attached to the second main surface 120M2 of the internal outer glass pane 120 via the second spacer 150A so that the circumference 150AE of the second spacer 150A may be offset outward with respect to the circumference 120E of the internal outer glass pane 120. As such, the multi-pane glass unit 100A described above with reference to FIGS. 2A to 2C may be manufactured.

In some embodiments, referring to FIG. 3, when the first spacer 140B and the second spacer 150B are formed to have round corners having relatively large radius of curvature because it is difficult to form the first spacer 140B and the second spacer 150B to have sharp corners, a corner portion of the circumference 140BE of the first spacer 140B and a corner portion of the circumference 150BE of the second spacer 150B are offset inward with respect to the circumference of the second glass pane 120, while a remaining portion of the circumference 140BE of the first spacer 140B and a remaining portion of the circumference 150BE of the second spacer 150B may be offset outward with respect to the circumference of the second glass pane 120. As such, the multi-pane glass unit 100B described above with reference to FIG. 3 may be manufactured.

In some embodiments, referring to FIG. 6, when misalignment occurs when the second spacer 150F is attached to the third glass pane 130 or when the third glass pane 130, to which the second spacer 150F is attached, is attached to the second glass pane 120, the multi-pane glass unit 100F illustrated above with reference to FIG. 6 may be manufactured.

Figure 13A:
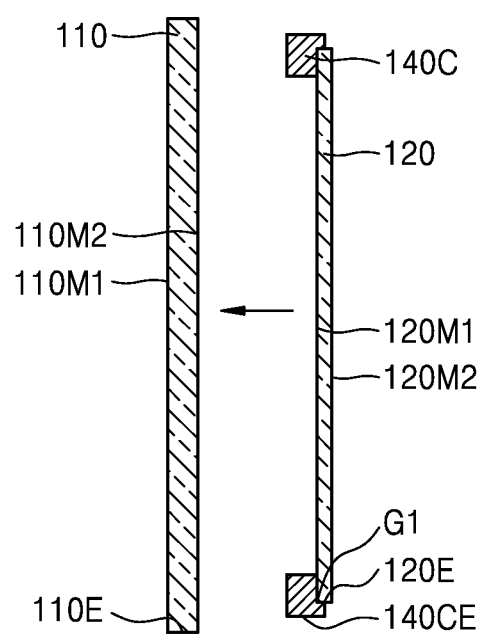
FIGS. 13A and 13B are cross-sectional views for illustrating a method of manufacturing a multi-pane glass unit according to an embodiment of the disclosure.
Figure 13B:
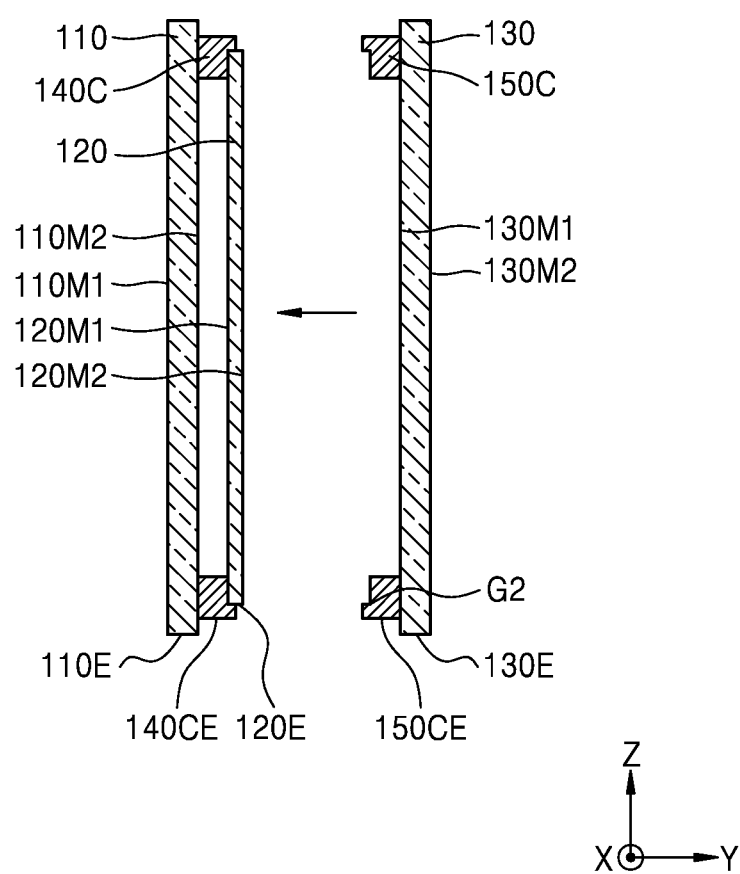

FIGS. 13A and 13B are cross-sectional views for illustrating a method of manufacturing a multi-pane glass unit according to an embodiment of the disclosure. Hereinafter, differences from the method of manufacturing the multi-pane glass unit described above with reference to FIGS. 12A and 12B will be described below.

Referring to FIG. 13A, the groove G1 is formed in the first spacer 140C and the inner glass pane 120 may be accommodated in the groove G1 of the first spacer 140C. For example, the groove G1 may be formed in the first spacer 140C by partially removing the first spacer 140C. Next, the inner glass pane 120 may be attached to the second main surface 110M2 of the first outer glass pane 110 via the first spacer 140C so that the circumference 140CE of the first spacer 140C may be offset outward with respect to the circumference 110E of the first outer glass pane 110.

Referring to FIG. 13B, the groove G2 is formed in the second spacer 150C, and the second spacer 150C may be attached to the first main surface 130M1 of the second outer glass pane 130 so that the circumference 150CE of the second spacer 150 may be offset inward with respect to the circumference 130E of the second outer glass pane 130. Next, the second outer glass pane 130 may be attached to the second main surface 120M2 of the inner glass pane 120 via the second spacer 150C, such that the inner glass pane 120 may be accommodated in the groove G2 of the second spacer 150C. As such, the multi-pane glass unit 100C described above with reference to FIG. 4 may be manufactured.

In some embodiments, referring to FIG. 4, the first spacer 140C is formed of a deformable material on the inner glass pane 120, and then, a sufficient force is applied to the inner glass pane 120 when the inner glass pane 120 is attached to the first outer glass pane 110 via the first spacer 140C to deform the first spacer 140C to have the groove G1. Also, the second spacer 150C is formed of a deformable material on the second outer glass pane 130, and then, a sufficient force is applied to the second outer glass pane 130 when the second outer glass pane 130 is attached to the inner glass pane 120 via the second spacer 150C to deform the second spacer 150C to have the groove G2. As such, the multi-pane glass unit 100C described above with reference to FIG. 4 may be manufactured.

In some embodiments, referring to FIG. 5, the groove G3 is formed in the first spacer 140D, and the inner glass pane 120 may be accommodated in the groove G3 of the first spacer 140D. For example, the groove G3 may be formed in the first spacer 140D by partially removing the first spacer 140D. Next, the inner glass pane 120 may be attached to the first outer glass pane 110 via the first spacer 140D, so that the circumference 140DE of the first spacer 140D may be offset inward from the circumference of the first outer glass pane 110. Next, the groove G4 is formed in the second spacer 150D, and then the second spacer 150D may be attached to the second outer glass pane 130 so that the circumference 150DE of the second spacer 150D may be offset inward with respect to the circumference 130E of the second outer glass pane 130. Next, the second outer glass pane 130 may be attached to the inner glass pane 120 via the second spacer 150D so that the first spacer 140D may be accommodated in the groove G4 of the second spacer 150D. As such, the multi-pane glass unit 100D described above with reference to FIG. 5 may be manufactured.

Figure 14:
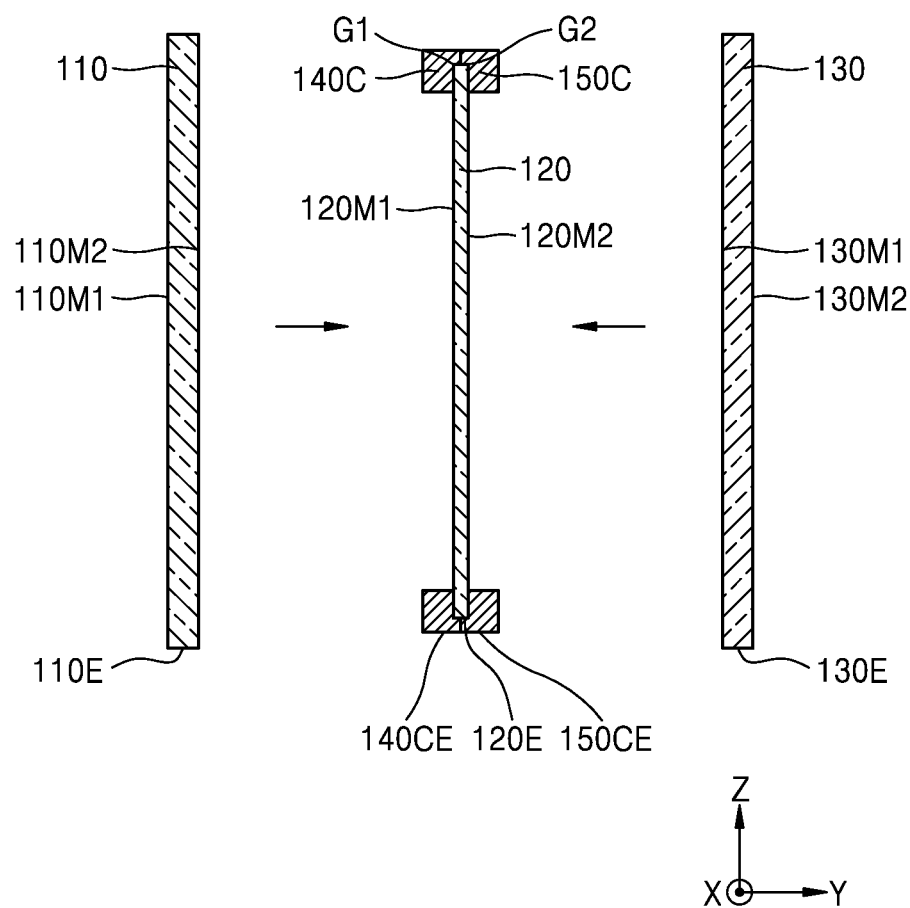
FIG. 14 is a cross-sectional view for illustrating a method of manufacturing a multi-pane glass unit according to an embodiment of the disclosure.

FIG. 14 is a cross-sectional view for illustrating a method of manufacturing a multi-pane glass unit according to an embodiment of the disclosure.

Referring to FIG. 14, the first spacer 140C may be attached to the first main surface 120M1 of the inner glass pane 120 so that at least a portion of the circumference 140CE of the first spacer 140C may be offset outward from the circumference 120E of the inner glass pane 120. Also, the second spacer 150C may be attached to the second main surface 120M2 of the inner glass pane 120 so that at least a portion of the circumference 150CE of the second spacer 150C may be offset outward from the circumference 120E of the inner glass pane 120. The first spacer 140C and the second spacer 150C may be simultaneously or sequentially attached to the inner glass pane 120. In some embodiments, the inner glass pane 120 may be accommodated in at least one of the groove G1 of the first spacer 140C and the groove G2 of the second spacer 150C.

Next, the first outer glass pane 110 may be attached to the first main surface 120M1 of the inner glass pane 120 via the first spacer 140C, so that the circumference 120E of the inner glass pane 120 may be offset inward with respect to the circumference 110E of the first outer glass pane 110. Also, the second outer glass pane 130 may be attached to the first main surface 120M1 of the inner glass pane 120 via the second spacer 150C, so that the circumference 120E of the inner glass pane 120 may be offset inward with respect to the circumference 130E of the second outer glass pane 130. The first outer glass pane 110 and the second outer glass pane 130 may be simultaneously or sequentially attached to the inner glass pane 120. As such, the multi-pane glass unit 100C described above with reference to FIG. 4 or the multi-pane glass unit 100D described above with reference to FIG. 5 may be manufactured. According to the manufacturing method described above with reference to FIG. 14, the first spacer 140C and the second spacer 150C may be easily aligned with each other.

The embodiments of the disclosure are intended to illustrate and not limit the technical spirit of the disclosure, and the scope of the technical idea of the disclosure is not limited by these embodiments. The scope of which is to be interpreted by the following claims, and all technical ideas which are within the scope of the equivalence should be interpreted as being included in the scope of the right.

What is claimed is:

1. A multi-pane glass unit comprising:
a first outer glass pane and a second outer glass pane facing each other;
a first inner glass pane between the first outer glass pane and the second outer glass pane;
a first spacer located between and directly contacting a main surface of the first outer glass pane and a first main surface of the first inner glass pane, the first spacer spacing the first inner glass pane apart from the first outer glass pane;
a second spacer located between and directly contacting a main surface of the second outer glass pane and a second main surface of the first inner glass pane, the second spacer spacing the first inner glass pane apart from the second outer glass pane; and
a sealing material surrounding a circumference of the first spacer and a circumference of the second spacer and filling a space between the first outer glass pane and the second outer glass pane,
wherein a thickness of the first inner glass pane is less than a thickness of the first outer glass pane and a thickness of the second outer glass pane,
a composition of the first inner glass pane is different from a composition of the first outer glass pane and a composition of the second outer glass pane,
a circumference of the first inner glass pane is offset inward with respect to a circumference of the first outer glass pane and a circumference of the second outer glass pane,
wherein the sealing material does not protrude outward of the circumference of the first outer glass pane and the circumference of the second outer glass pane,
the first spacer and the second spacer have surface portions that directly abut one another,
wherein one or more of the first spacer and the second spacer directly contacts the circumference of the first inner glass pane, and
wherein the first spacer contacts a major surface of the first outer glass pane with an entire surface of the first spacer spanning from a peripheral edge of the first spacer to an interior edge of the first spacer, and the second spacer contacts a major surface of the second outer glass pane with an entire surface of the second spacer spanning from a peripheral edge of the second spacer to an interior edge of the second spacer.

2. The multi-pane glass unit of claim 1, wherein the thickness of the first inner glass pane is 0.2 mm to 1.0 mm.

3. The multi-pane glass unit of claim 1, wherein a thermal expansion coefficient of the first inner glass pane is less than a thermal expansion coefficient of the first outer glass pane and a thermal expansion coefficient of the second outer glass pane.

4. The multi-pane glass unit of claim 1, wherein the first inner glass pane has not undergone a strengthening process.

5. The multi-pane glass unit of claim 1, wherein a sunlight absorption of the first inner glass pane is less than a sunlight absorption of the first outer glass pane and a sunlight absorption of the second outer glass pane.

6. The multi-pane glass unit of claim 1, wherein a sunlight transmittance of the first inner glass pane is greater than a sunlight transmittance of the first outer glass pane and a sunlight transmittance of the second outer glass pane.

7. The multi-pane glass unit of claim 1, wherein a density of the first inner glass pane is less than a density of the first outer glass pane and a density of the second outer glass pane.

8. The multi-pane glass unit of claim 1, wherein
each of the first outer glass pane and the second outer glass pane comprises soda lime glass, and
the first inner glass pane comprises boroaluminosilicate glass.

9. The multi-pane glass unit of claim 1, further comprising:
a second inner glass pane located between the first inner glass pane and the second outer glass pane, the second inner glass pane being spaced apart from the first inner glass pane by the second spacer; and a third spacer located between the second outer glass pane and the second inner glass pane, the third spacer spacing the second inner glass pane apart from the second outer glass pane.

10. The multi-pane glass unit of claim 1, wherein each of the first spacer and the second spacer directly contacts the circumference of the first inner glass pane.

11. The multi-pane glass unit of claim 1, wherein each of the first spacer and the second spacer extends along a closed path proximate the circumference of the first inner glass pane, and wherein each of the first spacer and the second spacer has a cross section that is monolithic when viewed perpendicular to the close path.

12. A window comprising:
the multi-pane glass unit according to claim 1; and
a frame surrounding a circumference of the multi-pane glass unit.

13. A multi-pane glass unit, comprising:
a first outer glass pane and a second outer glass pane facing each other;
a first inner glass pane between the first outer glass pane and the second outer glass pane;
a first spacer located between the first outer glass pane and the first inner glass pane, the first spacer spacing the first inner glass pane apart from the first outer glass pane;
a second spacer located between the second outer glass pane and the first inner glass pane, the second spacer spacing the first inner glass pane apart from the second outer glass pane; and
a sealing material surrounding a circumference of the first spacer and a circumference of the second spacer and filling a space between the first outer glass pane and the second outer glass pane,
wherein a thickness of the first inner glass pane is less than a thickness of the first outer glass pane and a thickness of the second outer glass pane,
a composition of the first inner glass pane is different from a composition of the first outer glass pane and a composition of the second outer glass pane,
a circumference of the first inner glass pane is offset inward with respect to a circumference of the first outer glass pane and a circumference of the second outer glass pane,
wherein the sealing material does not protrude outward of the circumference of the first outer glass pane and the circumference of the second outer glass pane,
the first spacer and the second spacer have surface portions that directly abut one another,
wherein only one of the first spacer and the second spacer is in contact with the circumference of the first inner glass pane, and
wherein the first spacer has a protruding portion that defines a groove into which the circumference of the first inner glass pane is accommodated, and wherein the second spacer has a groove into which the protruding portion of the first spacer is accommodated.

14. The multi-pane glass unit of claim 13, wherein the first spacer contacts a major surface of the first outer glass pane with an entire surface of the first spacer spanning from a peripheral edge of the first spacer to an interior edge of the first spacer, and the second spacer contacts a major surface of the second outer glass pane with an entire surface of the second spacer spanning from a peripheral edge of the second spacer to an interior edge of the second spacer.

15. A multi-pane glass unit comprising:
a first outer glass pane and a second outer glass pane facing each other;
a first inner glass pane between the first outer glass pane and the second outer glass pane;
a first spacer located between and directly contacting a main surface of the first outer glass pane and a first main surface of the first inner glass pane, the first spacer spacing the first inner glass pane apart from the first outer glass pane;
a second spacer located between and directly contacting a main surface of the second outer glass pane and a second main surface of the first inner glass pane, the second spacer spacing the first inner glass pane apart from the second outer glass pane; and
a sealing material surrounding a circumference of the first spacer and a circumference of the second spacer and filling a space between the first outer glass pane and the second outer glass pane,
wherein a thickness of the first inner glass pane is less than a thickness of the first outer glass pane and a thickness of the second outer glass pane,
a composition of the first inner glass pane is different from a composition of the first outer glass pane and a composition of the second outer glass pane,
a circumference of the first inner glass pane is offset inward with respect to a circumference of the first outer glass pane and a circumference of the second outer glass pane,
wherein the sealing material does not protrude outward of the circumference of the first outer glass pane and the circumference of the second outer glass pane,
the first spacer and the second spacer have surface portions that directly abut one another, and
wherein each of the first spacer and the second spacer directly contacts the circumference of the first inner glass pane.

16. The multi-pane glass unit of claim 15, wherein the thickness of the first inner glass pane is 0.2 mm to 1.0 mm.

17. The multi-pane glass unit of claim 15, wherein a thermal expansion coefficient of the first inner glass pane is less than a thermal expansion coefficient of the first outer glass pane and a thermal expansion coefficient of the second outer glass pane.

18. The multi-pane glass unit of claim 15, wherein a sunlight absorption of the first inner glass pane is less than a sunlight absorption of the first outer glass pane and a sunlight absorption of the second outer glass pane.

19. The multi-pane glass unit of claim 15, wherein:
each of the first outer glass pane and the second outer glass pane comprises soda lime glass, and
the first inner glass pane comprises boroaluminosilicate glass.

20. The multi-pane glass unit of claim 15, further comprising:
a second inner glass pane located between the first inner glass pane and the second outer glass pane, the second inner glass pane being spaced apart from the first inner glass pane by the second spacer; and
a third spacer located between the second outer glass pane and the second inner glass pane, the third spacer spacing the second inner glass pane apart from the second outer glass pane.

* * * * *